United States Patent
Okuno et al.

(10) Patent No.: US 11,010,186 B2
(45) Date of Patent: May 18, 2021

(54) NON-TRANSITORY COMPUTER-READABLE RECORDING MEDIUM, ADJUSTMENT DEVICE, AND ADJUSTMENT METHOD

(71) Applicant: FUJITSU LIMITED, Kawasaki (JP)

(72) Inventors: Shingo Okuno, Kawasaki (JP);
Yukihiro Watanabe, Kawasaki (JP);
Fumi Iikura, Shinagawa (JP);
Masahiro Asaoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 41 days.

(21) Appl. No.: 16/127,347

(22) Filed: Sep. 11, 2018

(65) Prior Publication Data

US 2019/0095232 A1 Mar. 28, 2019

(30) Foreign Application Priority Data

Sep. 22, 2017 (JP) .............................. JP2017-182387

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC ............... G06F 9/4856; G06F 11/1484; G06F 2209/5019; G06F 3/0647; G06F 8/656;
(Continued)

(56) References Cited

U.S. PATENT DOCUMENTS

2010/0161922 A1* 6/2010 Sharp ................... G06F 9/45558
 711/162
2012/0017114 A1* 1/2012 Timashev ........... G06F 11/1469
 714/15
(Continued)

FOREIGN PATENT DOCUMENTS

JP 2014-006739 1/2014
JP 2014-153997 8/2014
(Continued)

OTHER PUBLICATIONS

Vielma, J.P., "Mixed Integer Linear Programming Formulation Techniques", SIAM Review, vol. 57, No. 1, pp. 3-57, 2015 (56 pages).
(Continued)

*Primary Examiner* — Dong U Kim
(74) *Attorney, Agent, or Firm* — Fujitsu Patent Center

(57) ABSTRACT

An apparatus includes a memory configured to store configuration information related to a physical machine and a virtual machine that operates on the physical machine, and temporal information indicating a time turnaround for migration of the virtual machine from the physical machine to another physical machine. Upon acquisition of data indicating a duration of a maintenance execution related to a physical machine, the apparatus produces, based on the configuration information and the temporal information stored in the memory, a constraint condition for the virtual machine that operates on the physical machine, where the constraint condition is used to determine a schedule of the migration. The apparatus produces schedule information of the migration, based on the constraint condition and the duration of the maintenance execution, and outputs the schedule information to a device used by a user of the virtual machine.

11 Claims, 31 Drawing Sheets

(58) Field of Classification Search
CPC ............... G06F 9/5033; G06F 9/45558; G06F 2009/45595; G06F 2009/4557
See application file for complete search history.

(56) References Cited

U.S. PATENT DOCUMENTS

| | | | |
|---|---|---|---|
| 2013/0055262 A1* | 2/2013 | Lubsey | G06F 9/5011 718/1 |
| 2013/0097296 A1* | 4/2013 | Gehrmann | G06F 9/4856 709/223 |
| 2013/0305242 A1* | 11/2013 | Wang | G06F 9/45558 718/1 |
| 2013/0346973 A1 | 12/2013 | Oda et al. | |
| 2014/0019974 A1* | 1/2014 | Siu | G06F 9/45558 718/1 |
| 2014/0068343 A1* | 3/2014 | Nakajima | G06F 11/3051 714/39 |
| 2015/0149999 A1* | 5/2015 | Ramanathan | G06F 9/4856 718/1 |
| 2015/0160972 A1* | 6/2015 | Yu | G06F 9/4856 718/1 |
| 2016/0154664 A1* | 6/2016 | Iwamatsu | G06F 9/45558 718/1 |
| 2016/0366020 A1* | 12/2016 | Ramachandran | G06Q 10/0631 |
| 2016/0378532 A1* | 12/2016 | Vincent | G06F 9/45558 718/1 |
| 2017/0003951 A1* | 1/2017 | Newell | G06F 9/45558 |
| 2017/0060611 A1* | 3/2017 | Birkestrand | G06F 9/4856 |
| 2017/0272515 A1* | 9/2017 | Sanderson | G06F 3/0604 |
| 2018/0129523 A1* | 5/2018 | Bryant | G06F 9/4856 |
| 2019/0079791 A1* | 3/2019 | Zhong | G06F 3/0614 |

FOREIGN PATENT DOCUMENTS

| | | |
|---|---|---|
| JP | 2015-161956 | 9/2015 |
| JP | 2015-172794 | 10/2015 |
| JP | 2015-222464 | 12/2015 |

OTHER PUBLICATIONS

Free Software Foundation,Inc., "GLPK (GNU Linear Programming Kit)", <URL:http://www.gnu.org/software/glpk/glpk.html> (2 pages).

Zuse Institute Berlin, "SCIP (Solving Constraint Integer Programs)", <URL:http://scip.zib.de/> (13 pages).

IBM Corporation, "IBM ILOG CPLEX Optimizer", <URL:http://www-01.ibm.com/software/commerce/optimization/cplex-optimizer/index.html> (7 pages).

Gomes, C.P., et al., "Satisfiability Solvers", in Handbook of Knowledge Representation (F. van Harmelen, V. Lifschitz, and B.Porter, eds.), pp. 89-134, Foundations of Artificial Intelligence, 2008 (46 pages).

Eén, N., et al., "The MiniSat Page", <URL:http://minisat.se/Main.html> 2005 (2 pages).

Audemard, G., et al., "The Glucose SAT Solver", <URL:http://www.labri.fr/perso/lsimon/glucose/> (6 pages).

* cited by examiner

FIG. 7

| MAINTENANCE EXECUTION DURATION INFORMATION | | M1 |
|---|---|---|
| START DATE AND TIME | END DATE AND TIME | |
| 2017-06-01T12:00:00.000Z | 2017-06-30T11:59:00.000Z | |

FIG. 8

| MAINTENANCE TARGET MACHINE INFORMATION | | M2 |
|---|---|---|
| PHYSICAL MACHINE NAME | MAINTENANCE TURNAROUND TIME | |
| PM01 | 01:00:00.000 | |
| PM02 | 02:00:00.000 | |
| ... | ... | |

FIG. 11

VIRTUAL MACHINE OPERATION TABLE 123

| PHYSICAL MACHINE NAME | VIRTUAL MACHINE NAME | USER ID |
|---|---|---|
| PM01 | server-90 | user3 |
| | mysql-67 | user3 |
| | accounting-db-03 | user1 |
| | accounting-web-03 | user1 |
| ... | ... | ... |
| PM05 | accounting-db-13 | user1 |
| | vm-67 | user2 |
| ... | ... | ... |

FIG. 12

DEPENDENCY RELATION TABLE 124

| GROUP NAME | VIRTUAL MACHINE NAME | RULE |
|---|---|---|
| G01 | accounting-db-13 | anti-affinity |
| | accounting-db-03 | |
| G02 | accounting-db-03 | affinity |
| | accounting-web-03 | |
| ... | ... | ... |

FIG. 13

| LM TURNAROUND TIME TABLE ||| 131 |
|---|---|---|
| TIME | VIRTUAL MACHINE NAME | LM TURNAROUND TIME |
| ... | ... | ... |
| 2017-06-20T09:00:00.000Z | ... | ... |
| | server-90 | 00:15:00.000 |
| | mysql-67 | 00:15:00.000 |
| | accounting-db-03 | 00:30:00.000 |
| | accounting-web-03 | 00:30:00.000 |
| | ... | ... |
| 2017-06-20T10:00:00.000Z | ... | ... |
| | server-90 | 00:15:00.000 |
| | mysql-67 | 00:10:00.000 |
| | accounting-db-03 | 00:20:00.000 |
| | accounting-web-03 | 00:20:00.000 |
| | ... | ... |
| ... | ... | ... |

FIG. 14

| MAINTENANCE SCHEDULE TABLE | | | 161 |
|---|---|---|---|
| PHYSICAL MACHINE NAME | START DATE AND TIME | END DATE AND TIME | |
| PM01 | 2017-06-20T10:30:00.000Z | 2017-06-20T11:29:00.000Z | |
| ... | ... | ... | |

FIG. 15

LM SCHEDULE TABLE 162

| VIRTUAL MACHINE NAME | START DATE AND TIME | END DATE AND TIME | MIGRATION SOURCE | MIGRATION DESTINATION | STATE |
|---|---|---|---|---|---|
| ... | ... | ... | ... | ... | ... |
| server-90 | 2017-06-20T09:45:00.000Z | 2017-06-20T09:59:00.000Z | PM01 | PM02 | CONFIRMED |
| mysql-67 | 2017-06-20T10:00:00.000Z | 2017-06-20T10:09:00.000Z | PM01 | PM02 | CONFIRMED |
| accounting-db-03 | 2017-06-20T10:10:00.000Z | 2017-06-20T10:29:00.000Z | PM01 | PM02 | YET TO BE CONFIRMED |
| accounting-web-03 | 2017-06-20T10:10:00.000Z | 2017-06-20T10:29:00.000Z | | PM02 | YET TO BE CONFIRMED |
| ... | ... | ... | ... | ... | ... |

FIG. 16

| LM EXECUTION REFUSAL DATE AND TIME INFORMATION | | | M3 |
|---|---|---|---|
| VIRTUAL MACHINE NAME | START DATE AND TIME | END DATE AND TIME | |
| ... | ... | ... | |
| mysql-67 | 2017-06-20T11:00:00.000Z | 2017-06-20T13:59:00.000Z | |
| ... | ... | ... | |

FIG. 17

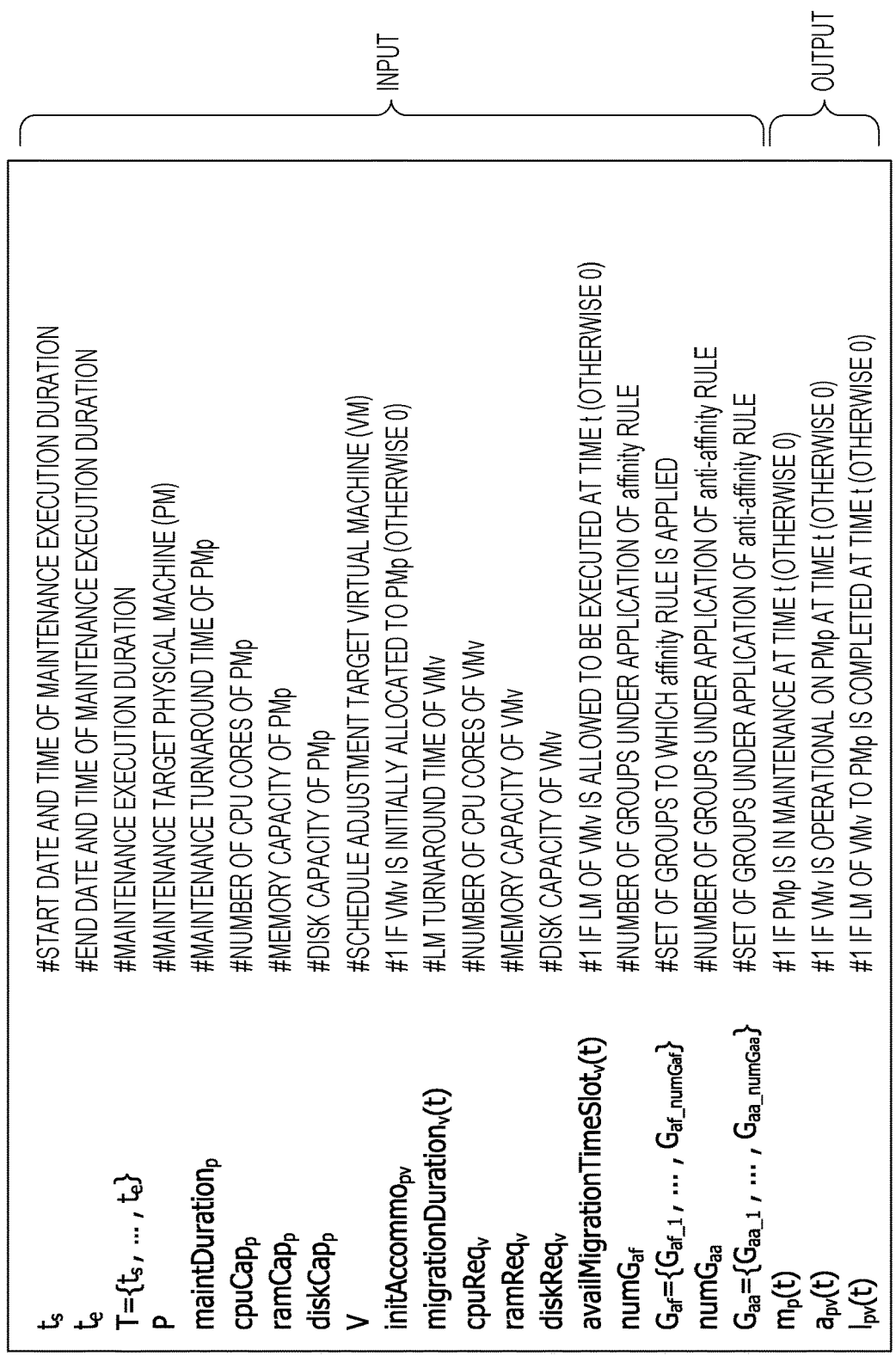

INPUT:
- $t_s$ — #START DATE AND TIME OF MAINTENANCE EXECUTION DURATION
- $t_e$ — #END DATE AND TIME OF MAINTENANCE EXECUTION DURATION
- $T = \{t_s, \ldots, t_e\}$ — #MAINTENANCE EXECUTION DURATION
- $P$ — #MAINTENANCE TARGET PHYSICAL MACHINE (PM)
- $\text{maintDuration}_p$ — #MAINTENANCE TURNAROUND TIME OF PMp
- $\text{cpuCap}_p$ — #NUMBER OF CPU CORES OF PMp
- $\text{ramCap}_p$ — #MEMORY CAPACITY OF PMp
- $\text{diskCap}_p$ — #DISK CAPACITY OF PMp
- $V$ — #SCHEDULE ADJUSTMENT TARGET VIRTUAL MACHINE (VM)
- $\text{initAccommo}_{pv}$ — #1 IF VMv IS INITIALLY ALLOCATED TO PMp (OTHERWISE 0)
- $\text{migrationDuration}_v(t)$ — #LM TURNAROUND TIME OF VMv
- $\text{cpuReq}_v$ — #NUMBER OF CPU CORES OF VMv
- $\text{ramReq}_v$ — #MEMORY CAPACITY OF VMv
- $\text{diskReq}_v$ — #DISK CAPACITY OF VMv
- $\text{availMigrationTimeSlot}_v(t)$ — #1 IF LM OF VMv IS ALLOWED TO BE EXECUTED AT TIME t (OTHERWISE 0)
- $\text{numG}_{af}$ — #NUMBER OF GROUPS UNDER APPLICATION OF affinity RULE
- $G_{af} = \{G_{af\_1}, \ldots, G_{af\_numGaf}\}$ — #SET OF GROUPS TO WHICH affinity RULE IS APPLIED
- $\text{numG}_{aa}$ — #NUMBER OF GROUPS UNDER APPLICATION OF anti-affinity RULE
- $G_{aa} = \{G_{aa\_1}, \ldots, G_{aa\_numGaa}\}$ — #SET OF GROUPS UNDER APPLICATION OF anti-affinity RULE OUTPUT:
- $m_p(t)$ — #1 IF PMp IS IN MAINTENANCE AT TIME t (OTHERWISE 0)
- $a_{pv}(t)$ — #1 IF VMv IS OPERATIONAL ON PMp AT TIME t (OTHERWISE 0)
- $l_{pv}(t)$ — #1 IF LM OF VMv TO PMp IS COMPLETED AT TIME t (OTHERWISE 0)

| migrationDuration$_v$ | ... | $t_i$ | $t_{i+1}$ | $t_{i+2}$ | $t_{i+3}$ | $t_{i+4}$ | $t_{i+5}$ | ... |
|---|---|---|---|---|---|---|---|---|
| v1 | ... | 3 | 4 | 2 | 4 | 6 | 5 | ... |
| v2 | ... | 8 | 6 | 7 | 5 | 3 | 4 | ... |
| ⋮ | | ... | ... | ... | ... | ... | ... | ... |

| $l_{pv}(t)$, p=C | ... | $t_i$ | $t_{i+1}$ | $t_{i+2}$ | $t_{i+3}$ | $t_{i+4}$ | $t_{i+5}$ | ... |
|---|---|---|---|---|---|---|---|---|
| v1 | ... | 0 | 0 | 1 | 0 | 0 | 0 | ... |
| v2 | ... | 0 | 0 | 0 | 0 | 1 | 0 | ... |
| ⋮ | | ... | ... | ... | ... | ... | ... | ... |

| p FOR $a_{pv}(t)==1$ | ... | $t_i$ | $t_{i+1}$ | $t_{i+2}$ | $t_{i+3}$ | $t_{i+4}$ | $t_{i+5}$ | ... |
|---|---|---|---|---|---|---|---|---|
| v1 | ... | A | A | A | C | C | C | ... |
| v2 | ... | B | B | B | B | B | C | ... |
| ⋮ | | ... | ... | ... | ... | ... | ... | ... |

FIG. 24

```
t_s := 0;
t_e := 41759;        } TIME IS DISCRETIZED ON THE BASIS OF t_s
                       (IN UNITS OF MINUTES)

0: JUNE 1, 2017 12:00
                       41759: JUNE 30, 2017 11:59

P :=
"PM01"
"PM02"               } PM NAME ON EACH LINE
...
;

maintDuration_p :=
"PM01" 60
"PM02" 120           } "PM NAME" "MAINTENANCE
...                    TURNAROUND TIME (MINUTES)"
;

cpuCap_p :=
"PM01" 64
"PM02" 32            } "PM NAME" "NUMBER
...                    OF CPU CORES"
;

ramCap_p :=
"PM01" 256
"PM02" 128           } "PM NAME"
...                    "MEMORY CAPACITY"
;

diskCap_p :=
"PM01" 32000
"PM02" 128000        } "PM NAME"
...                    "DISK CAPACITY"
;
```

FIG. 25

```
V :=
"accounting-db-13"
"vm-67"
"server-90"          } VM NAME ON
"mysql-67"             EACH LINE
"accounting-db-03"
"accounting-web-03"
...
;

initAccommo_pv :=
...
"PM01" "mysql-67" 1
"PM02" "mysql-67" 0          } "PM NAME"
"PM01" "accounting-db-03" 1    "VM NAME" "0 or 1"
"PM02" "accounting-db-03" 0
...
;
```

FIG. 26

```
migrationDuration_v(t) :=
...
"server-90" 27180 15
"mysql-67" 27180 15
"accounting-db-03" 27180 30
"accounting-web-03" 27180 30
...
"server-90" 27239 15
"mysql-67" 27239 15
"accounting-db-03" 27239 30
"accounting-web-03" 27239 30
...
"server-90" 27240 15
"mysql-67" 27240 10
"accounting-db-03" 27240 20
"accounting-web-03" 27240 20
...
"server-90" 27241 15
"mysql-67" 27241 10
"accounting-db-03" 27241 20
"accounting-web-03" 27241 20
...
;
```

27180: JUNE 20, 2017 9:00
27239: JUNE 20, 2017 9:59
27240: JUNE 20, 2017 10:00
27241: JUNE 20, 2017 10:01

"VM NAME" "TIME" "LM TURNAROUND TIME (MINUTES)"

FIG. 27

```
cpuReq_v :=
"accounting-db-13" 2
"vm-67" 2
"server-90" 8
"mysql-67" 4
"accounting-db-03" 2
"accounting-web-03" 4
...
;
```
"VM NAME"
"NUMBER OF CPU CORES"

```
ramReq_v :=
"accounting-db-13" 32
"vm-67" 2
"server-90" 8
"mysql-67" 4
"accounting-db-03" 16
"accounting-web-03" 16
...
;
```
"VM NAME"
"MEMORY CAPACITY"

```
diskReq_v :=
"accounting-db-13" 2000
"vm-67" 32
"server-90" 64
"mysql-67" 128
"accounting-db-03" 2000
"accounting-web-03" 256
...
;
```
"VM NAME"
"DISK CAPACITY"

FIG. 30

$I_{pv}(t)=$
"PM01" "server-90" 27238 0
"PM01" "server-90" 27239 0
"PM01" "server-90" 27240 0
"PM01" "server-90" 27241 0
...
"PM01" "mysql-67" 27248 0
"PM01" "mysql-67" 27249 0
"PM01" "mysql-67" 27250 0
"PM01" "mysql-67" 27251 0
...
"PM02" "server-90" 27238 0
"PM02" "server-90" 27239 1
"PM02" "server-90" 27240 0
"PM02" "server-90" 27241 0
...
"PM02" "mysql-67" 27248 0
"PM02" "mysql-67" 27249 1
"PM02" "mysql-67" 27250 0
"PM02" "mysql-67" 27251 0
...
;

27238: JUNE 20, 2017 9:58
27239: JUNE 20, 2017 9:59
27240: JUNE 20, 2017 10:00
27241: JUNE 20, 2017 10:01

"PM NAME" "VM NAME" "TIME" "0 or 1"

27248: JUNE 20, 2017 10:08
27249: JUNE 20, 2017 10:09
27250: JUNE 20, 2017 10:10
27251: JUNE 20, 2017 10:11

NON-TRANSITORY COMPUTER-READABLE RECORDING MEDIUM, ADJUSTMENT DEVICE, AND ADJUSTMENT METHOD

CROSS-REFERENCE TO RELATED APPLICATION

This application is based upon and claims the benefit of priority of the prior Japanese Patent Application No. 2017-182387, filed on Sep. 22, 2017, the entire contents of which are incorporated herein by reference.

FIELD

The embodiments discussed herein are related to a non-transitory computer-readable storage medium, an adjustment device, and an adjustment method.

BACKGROUND

In virtualization technology used in the field of information processing, a plurality of virtual computers (also referred to as virtual machines or virtual hosts) operate on a physical computer (also referred to as a physical machine or a physical host). Software such as an operating system (OS) is executed on each virtual machine. A physical machine using the virtualization technology executes software for managing a plurality of virtual machines. For example, software called hypervisor allocates the processing capacity of a central processing unit (CPU) and a storage region of a random access memory (RAM) as computation resources to the plurality of virtual machines.

In some systems including a plurality of physical machines, it is possible to change physical machines on which a virtual machine is executed. For example, such a system uses a technology of enabling migration of data related to the virtual machine between hypervisors after or without halting the virtual machine.

For example, when a virtual-host migration scheduled day input by a user is later than a server-instrument maintenance scheduled day, a disclosed maintenance management device prompts correction of the migration scheduled day, and reserves migration of the virtual host to a server instrument as the migration destination on the migration scheduled day.

In another disclosure, an order in which live migration of a plurality of virtual machines is executed is determined based on at least one of information related to the virtual machines and information related to network traffic.

In another disclosure, working schedules of nurses (staff) working at a specific ward of a hospital are determined by using a satisfiability problem (SAT) solver.

Related techniques are disclosed in, for example, Japanese Laid-open Patent Publication Nos. 2015-161956, 2014-153997, 2015-222464, and 2015-172794.

SUMMARY

According to an aspect of the invention, an apparatus includes a memory configured to store configuration information related to a physical machine and a virtual machine that operates on the physical machine, and temporal information indicating a time turnaround for migration of the virtual machine from the physical machine to another physical machine. Upon acquisition of data indicating a duration of a maintenance execution related to a physical machine, the apparatus produces, based on the configuration information and the temporal information stored in the memory, a constraint condition for the virtual machine that operates on the physical machine, where the constraint condition is used to determine a schedule of the migration. The apparatus produces schedule information of the migration, based on the constraint condition and the duration of the maintenance execution, and outputs the schedule information to a device used by a user of the virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating exemplary maintenance execution duration information;

FIG. 8 is a diagram illustrating exemplary maintenance target machine information;

FIG. 11 is a diagram illustrating an exemplary virtual machine operation table;

FIG. 12 is a diagram illustrating an exemplary dependency relation table;

FIG. 13 is a diagram illustrating an exemplary LM turnaround time table;

FIG. 14 is a diagram illustrating an exemplary maintenance schedule table;

FIG. 15 is a diagram illustrating an exemplary LM schedule table;

FIG. 16 is a diagram illustrating exemplary LM execution refusal date and time information;

FIG. 17 is a diagram illustrating exemplary variables in a constraint satisfaction problem;

FIG. 24 is a diagram illustrating exemplary input data (1) to a solver unit;

FIG. 25 is a diagram illustrating exemplary input data (2) to the solver unit;

FIG. 26 is a diagram illustrating exemplary input data (3) to the solver unit;

FIG. 27 is a diagram illustrating exemplary input data (4) to the solver unit;

FIG. 30 is a diagram illustrating exemplary output data (2) from the solver unit;

DESCRIPTION OF EMBODIMENTS

When performing maintenance of a physical machine, an operator that provides use environment of a virtual machine to a user migrates any virtual machine on the physical machine on which maintenance is performed to another physical machine in advance in some cases. In such a case, migration processing potentially decreases the performance of the virtual machine and temporarily disables use of the virtual machine. Thus, the operator often notifies in advance the user of the schedule of maintenance and the schedule of migration of the virtual machine along with the maintenance. However, when the migration schedule of the virtual machine is determined by the operator, the schedule of use of the virtual machine by the user is not considered in many cases, which potentially causes adverse influence on the user.

To avoid this, for example, business convenience is input by the user to determine the migration schedule of the virtual machine by the operator. However, the user does not necessarily know a time slot when a load on the virtual machine is high. Thus, when the migration schedule of the virtual machine is determined based on the business convenience of the user, the migration processing is potentially executed in a time slot when the load on the virtual machine is high, which potentially worsens the influence on use of the virtual machine by the user.

According to an aspect, the embodiments discussed herein are intended to produce an appropriate migration schedule.

The present embodiments will be described below with reference to the accompanying drawings.

First Embodiment

Figure 1:
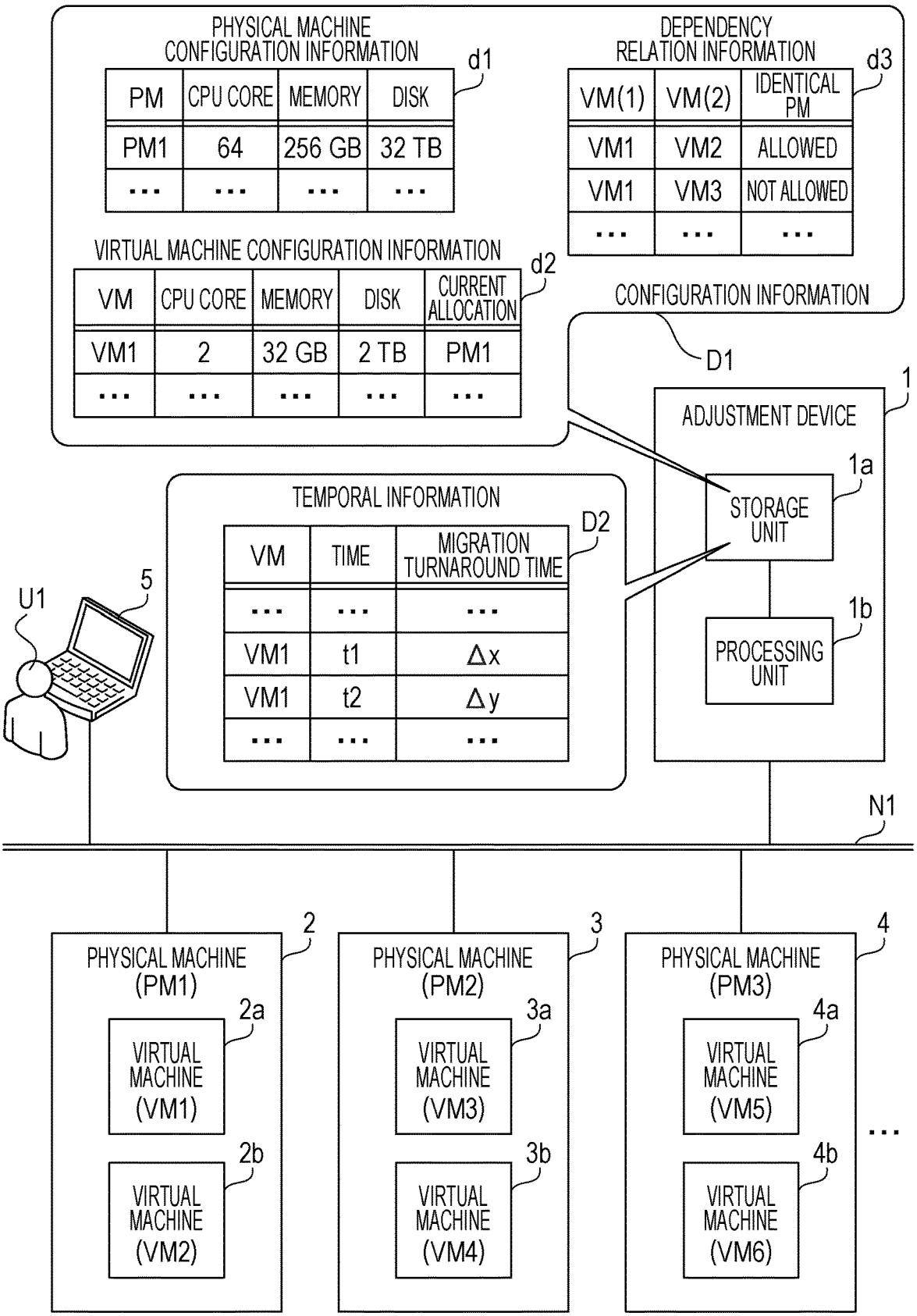
FIG. 1 is a diagram illustrating an information processing system according to a first embodiment.

FIG. 1 is a diagram illustrating an information processing system according to a first embodiment. The information processing system according to the first embodiment includes an adjustment device 1 and physical machines 2, 3, 4, . . . . The adjustment device 1 and the physical machines 2, 3, 4, . . . are connected with a network N1. The adjustment device 1 adjusts a migration schedule of virtual machines on the physical machines 2, 3, 4, . . . . The physical machines 2, 3, 4, . . . each include computation resources such as a CPU and a memory, and execute virtual machines by using the computation resources. For example, the physical machines 2, 3, 4, . . . each execute a hypervisor to allocate the computation resources to the virtual machines through the function of the hypervisor. Each physical machine is also abbreviated as a PM. Each virtual machine is also abbreviated as a VM.

The network N1 is also connected with a terminal device 5. The terminal device 5 is a client used by a user U1 of the virtual machines. The terminal device 5 may be connected with the network N1 through another network such as the Internet.

The physical machines 2, 3, 4, . . . each have a function to migrate a virtual machine operating on the physical machine to another physical machine. For example, the physical machines 2, 3, 4, . . . each execute the virtual machine migration by using a technology called live migration. The live migration migrates a virtual machine while maintaining an activation state of the virtual machine by copying information of the CPU and memory resources of a physical machine as a migration source, which is allocated to the virtual machine to be migrated, to a physical machine as a migration destination. The virtual machine may be migrated by using an alternative technology of cold migration in which the virtual machine is stopped and then the corresponding information of the virtual machine is copied the physical machine as a migration destination.

In a system operation, maintenance such as security patch application and OS upgrade is executed on a physical machine as a foundation (infrastructure) for achieving a virtual machine. In maintenance of a physical machine, the physical machine often has to be stopped. When the physical machine is stopped, any virtual machine on the physical machine is stopped and may not be used.

To avoid this, any virtual machine on the physical machine as a maintenance target is migrated to another physical machine before the maintenance of the physical machine, thereby executing the maintenance with reduced influence on the use of the virtual machine. For this, the adjustment device 1 supports production of a virtual-machine migration schedule. The adjustment device 1 includes a storage unit 1a and a processing unit 1b.

The storage unit 1a may be a transitory storage device such as a RAM, or a non-transitory storage device such as a hard disk drive (HDD) or a flash memory. The processing unit 1b may include, for example, a CPU, a digital signal processor (DSP), an application specific integrated circuit (ASIC), and a field programmable gate array (FPGA). The processing unit 1b may be a processor configured to execute a computer program. The processor may include a set (multiprocessor) of a plurality of processors.

The storage unit 1a stores configuration information D1 related to any physical machine and any virtual machine operating on the physical machine. The configuration information D1 includes information related to the infrastructure. For example, the configuration information D1 includes physical machine configuration information d1 indicating the configuration of each physical machine, virtual machine configuration information d2 indicating the configuration of each virtual machine, and dependency relation information d3 indicating a dependency relation between the virtual machines.

For example, the physical machines 2, 3, and 4 and the virtual machines 2a, 2b, 3a, 3b, 4a, and 4b have identification information as follows.

The identification information of the physical machine 2 is denoted by "PM1".

The identification information of the physical machine 3 is denoted by "PM2".

The identification information of the physical machine 4 is denoted by "PM3".

The identification information of the virtual machine 2a is denoted by "VM1".
The identification information of the virtual machine 2b is denoted by "VM2".
The identification information of the virtual machine 3a is denoted by "VM3".
The identification information of the virtual machine 3b is denoted by "VM4".
The identification information of the virtual machine 4a is denoted by "VM5".
The identification information of the virtual machine 4b is denoted by "VM6".

The physical machine configuration information d1 includes information of the number of CPU cores, a memory capacity, and a disk capacity of each physical machine. Specifically, the physical machine configuration information d1 registers, for the physical machine 2 (identification information "PM1"), a record that the number of CPU cores is "64", the memory capacity is "256 GB (gigabytes)", and the disk capacity is "32 TB (terabytes)". The physical machine configuration information d1 registers a similar record for any other physical machine.

The virtual machine configuration information d2 includes information of the number of CPU cores, a memory capacity, and a disk capacity allocated to each virtual machine, and current disposition (physical machine as a current disposition target) of the virtual machine. Specifically, the virtual machine configuration information d2 registers, for the virtual machine 2a (identification information "VM1"), a record indicating that the number of CPU cores is "2", the memory capacity is "32 GB", the disk capacity is "2 TB", and the current disposition is "PM1" (physical machine 2). The virtual machine configuration information d2 registers a similar record for any other virtual machine.

The dependency relation information d3 includes a combination of virtual machines, and information indicating whether the virtual machines belonging to the combination are allowed to operate on an identical physical machine. Specifically, the dependency relation information d3 registers, for the combination of the virtual machines 2a and 2b (combination of the identification information "VM1" and "VM2"), a record indicating that operation on an identical physical machine is allowed (identical PM "allowed"). The dependency relation information d3 registers, for the combination of the virtual machines 2a and 3a (combination of the identification information "VM1" and "VM3"), a record indicating that operation on an identical physical machine is not allowed (identical PM "not allowed"). For example, a set of virtual machines are operated on a common physical machine to improve performance or not operated on a common physical machine to achieve redundancy. Such a relation between virtual machines may be set as the dependency relation information d3 in advance.

The storage unit 1a stores temporal information D2 indicating a time turnaround for migration of a virtual machine from a physical machine to another physical machine. The temporal information D2 indicates the virtual-machine migration turnaround time (predicted turnaround time) at each time belonging to a maintenance execution duration. The turnaround time is provided for each virtual machine.

For example, the temporal information D2 includes information of a virtual machine, a time, and a migration turnaround time. Specifically, the temporal information D2 registers a record including the identification information "VM1", a time "t1", and a migration turnaround time "Δx" of the virtual machine 2a. This record indicates that "Δx" is a migration turnaround time for completing migration of the virtual machine 2a from the physical machine 2 to another physical machine at the time "t1".

The temporal information D2 registers a record including the identification information "VM1", a time "t2", and a migration turnaround time "Δy" of the virtual machine 2a. This record indicates that "Δy" is a migration turnaround time for completing migration of the virtual machine 2a from the physical machine 2 to another physical machine at the time "t2". The temporal information D2 also registers the migration turnaround time of the virtual machine 2a for any other time. The temporal information D2 also registers the migration turnaround time at each time for any other virtual machine.

The temporal information D2 may be stored in the storage unit 1a in advance. The temporal information D2 may be a result of prediction based on, for example, a history of a load on each virtual machine at each past time and a history of the migration turnaround time at each past time (for example, the processing unit 1b may store this prediction result in the storage unit 1a).

Figure 2:
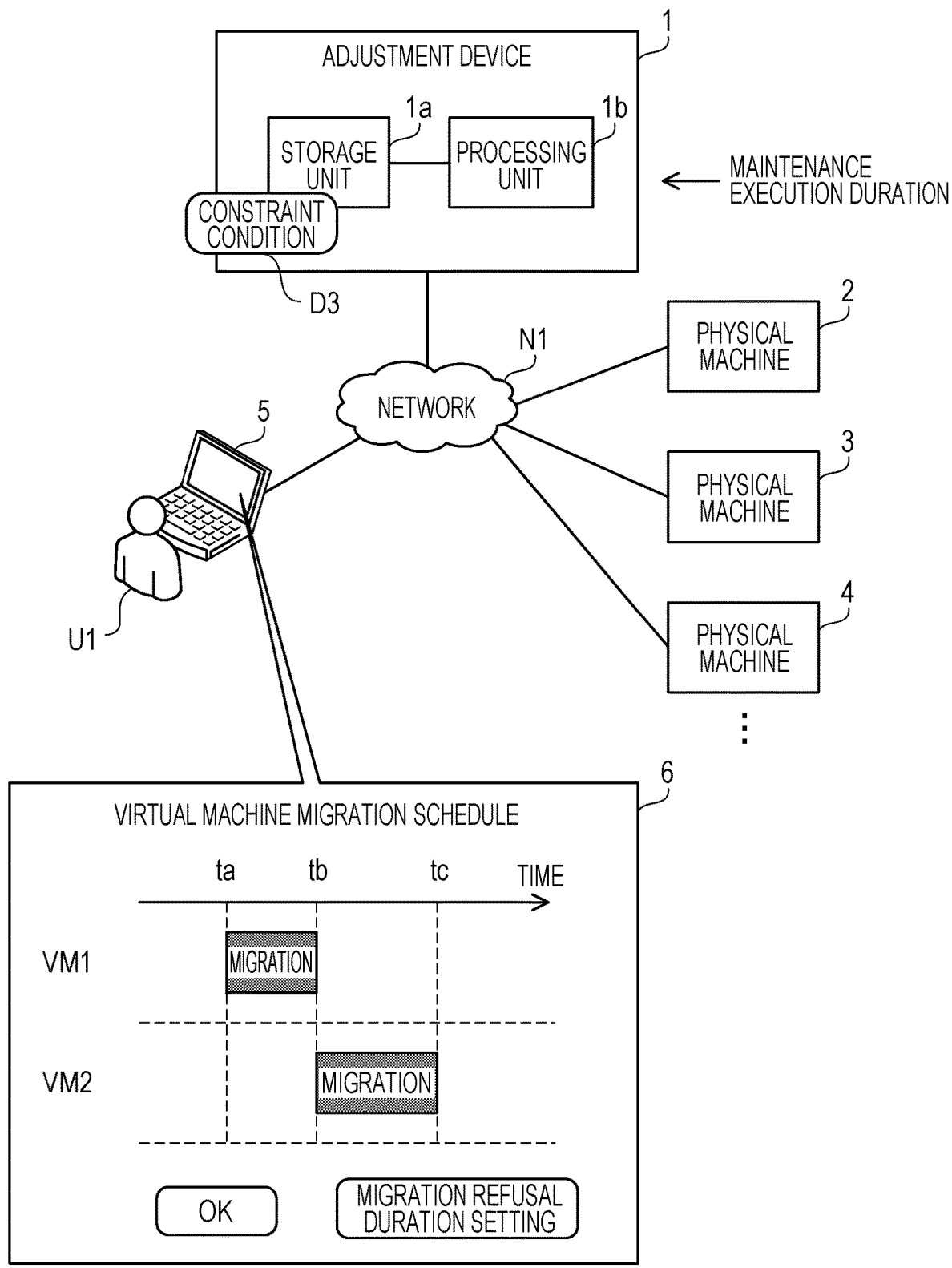
FIG. 2 is a diagram illustrating exemplary production of a virtual-machine migration schedule.

FIG. 2 is a diagram illustrating exemplary production of a virtual-machine migration schedule. Upon acquisition of a maintenance execution duration related to a physical machine, the processing unit 1b produces a constraint condition D3 for a virtual machine based on the configuration information D1 and the temporal information D2 stored in the storage unit 1a, the constraint condition D3 being used to determine a schedule of migration of the virtual machine. The constraint condition D3 indicates a constraint on the determination of a virtual-machine migration schedule. The virtual machine is as a migration target a virtual machine on a physical machine as a maintenance target.

The constraint condition D3 is produced from the configuration information D1 and the temporal information D2. The constraint condition D3 includes a constraint condition on the migration destination of a virtual machine based on the configuration information D1. The constraint condition based on the configuration information D1 is, for example, a condition for causing a set of virtual machines on a physical machine to operate (or not to operate) on an identical physical machine so that the sum of required resources of the virtual machines does not exceed resources of the physical machine.

The constraint condition D3 also includes a constraint condition on a migration timing and a migration time of a virtual machine based on the temporal information D2. The constraint condition based on the temporal information D2 includes, for example, a condition that migration of a virtual machine is not performed on a physical machine under maintenance. The constraint condition based on the temporal information D2 also includes a condition (objective function) that the sum of migration turnaround times of a virtual machine (when a plurality of virtual machines are to be migrated, the sum of migration turnaround times of the plurality of virtual machines) based on the temporal information D2 is minimized.

The following describes a method of producing, as an example of the constraint condition D3, a constraint on the virtual machines 2a and 3a (that the virtual machines 2a and 3a are not to be operated on an identical physical machine) in the dependency relation information d3.

(1) The processing unit 1b generates a group G to which the virtual machines 2a and 3a belongs.

(2) The processing unit 1b generates a constraint condition indicated by Expression (1).

$$\sum_{v \in G} a_{pv}(t) \leq 1, \quad \forall p \in P \qquad (1)$$

In the expression, v represents a virtual machine, p represents a physical machine, P represents a set of physical machines, and $a_{pv}(t)$ is equal to one when the virtual machine v is operating on the physical machine p at time t, or zero otherwise.

The processing unit 1b produces virtual-machine migration schedule information based on the constraint condition D3 and the maintenance execution duration. For example, the processing unit 1b inputs information of the produced constraint condition D3 and the maintenance execution duration to a constraint satisfaction determination solver, and produces a schedule satisfying the constraint condition D3 through a function of the constraint satisfaction determination solver. For example, the processing unit 1b may use an MILP (mixed integer linear programming) solver or a SAT solver as the constraint satisfaction determination solver. Hereinafter, the constraint satisfaction determination solver is also simply referred to as a solver.

In other words, the maintenance execution duration related to a physical machine is a candidate duration in which maintenance is performed on a physical machine as a maintenance target. For example, the processing unit 1b may further produce a constraint condition related to the maintenance execution duration of each physical machine based on information of a maintenance turnaround time for the physical machine (stored in the storage unit 1a in advance). Together with a virtual-machine migration schedule, the processing unit 1b may determine, through the solver based on the constraint condition, a duration in which maintenance of each physical machine is performed in the candidate duration. The processing unit 1b produces schedule information so that a virtual machine on a physical machine as a maintenance target is migrated to another physical machine before a duration in which maintenance of the physical machine is performed.

For example, the physical machine 2 (identification information "PM1") is one of maintenance targets. In this case, for example, the processing unit 1b produces schedule information that the virtual machine 2a is migrated from the physical machine 2 to the physical machine 4 between a time ta and a time tb, and the virtual machine 2b is migrated from the physical machine 2 to the physical machine 4 between the time tb and a time tc. The time tb is later than the time ta. The time tc is later than the time tb.

The processing unit 1b outputs produced schedule information to a device used by the user of a virtual machine as a migration target. For example, the user U1 uses the virtual machines 2a, 2b, 3a, and 3b. The storage unit 1a may store in advance a correspondence relation between identification information of a terminal device of a user and identification information of a virtual machine used by the user. This allows the processing unit 1b to specify the terminal device of a user corresponding to a virtual machine by referring to the storage unit 1a.

For example, the processing unit 1b transmits, to the terminal device 5, the schedule information that the virtual machine 2a (identification information "VM1") is migrated between the time ta and the time tb, and the virtual machine 2b (identification information "VM2") is migrated between the time tb and the time tc. The processing unit 1b does not have to provide the user U1 with information of physical machines as a migration source and a migration destination.

Having received the schedule information, the terminal device 5 displays, on a display connected with the terminal device 5, a screen 6 displaying a schedule indicated by the schedule information. The user U1 may browse the screen 6 to check the migration schedules of the virtual machines 2a and 2b used by the user U1.

In this manner, the adjustment device 1 produces an appropriate virtual-machine migration schedule.

For example, the processing unit 1b produces, as the constraint condition D3, a constraint condition that the sum of migration turnaround times of a virtual machine (when a plurality of virtual machines are to be migrated, the sum of migration turnaround times of the plurality of virtual machines) is minimized. Then, the processing unit 1b produces schedule information satisfying the condition based on the temporal information D2. Accordingly, the migration schedule of a virtual machine is produced with reduced influence on use of the virtual machine by the user U1.

The processing unit 1b may produce a constraint condition including the temporal information D2 and solve the constraint condition through the solver. Alternatively, the processing unit 1b may produce a constraint condition (with a migration turnaround time to be input as a variable) not including the temporal information D2, input a migration turnaround time of the temporal information D2 to the constraint condition, and solve the constraint condition through the solver (same for a constraint condition based on the configuration information D1).

The processing unit 1b also produces, as the constraint condition D3, a constraint condition related to the migration destination of a virtual machine based on the configuration information D1. Thus, the migration schedules of virtual machines are determined without deviating from operational specifications of a physical machine and a virtual machine. For example, when a migration schedule is produced only to minimize a time in which use of a virtual machine by the user U1 is affected, an operationally intended dependency relation between virtual machines potentially may not be held. For example, a virtual machine executing an application and a virtual machine executing a database (DB), which are to be allocated to an identical physical machine to improve performance, are migrated to separate physical machines. However, when the dependency relation is used as a constraint condition, such operationally unintended virtual-machine allocation is avoided.

The screen 6 may include a button (for example, an "OK" button) for allowing the user U1 to confirm a schedule. The screen 6 may also include a button for receiving refusal of the schedule by the user U1 (for example, a "migration refusal duration set button"). In response to inputting on the latter button, the processing unit 1b may further transmit information of a set screen for setting a migration refusal duration (migration disallowed time slot) of each virtual machine to the terminal device 5, and receive inputting of a migration refusal duration on the set screen by the user U1.

Then, the processing unit 1b may further produce a constraint condition corresponding to the migration refusal duration for the virtual machine in accordance with the input migration refusal duration, and reproduce schedule information related to a migration schedule of the virtual machine. In this case, the processing unit 1b transmits the reproduced schedule information to the terminal device 5 again, and causes the terminal device 5 to present the reproduced schedule information to the user U1. Alternatively, in place of the migration refusal duration input by the user U1, the processing unit 1b may acquire a migration allowed time slot input by the user U1, and reproduce a constraint condition and schedule information.

Specifically, the processing unit 1b acquires a migration disallowed time slot or a migration allowed time slot input by the user in response to output schedule information. The processing unit 1b reproduces a constraint condition based on the disallowed time slot or the allowed time slot, reproduces schedule information based on the reproduced constraint condition, and outputs the reproduced schedule information to the terminal device 5.

In this manner, when the migration schedule of a virtual machine is checked by the user U1 and the migration schedule is inconsistent with business convenience of the user U1, a migration refusal duration is specified to produce a migration schedule with further reduced influence on use of the virtual machine by the user U1.

The following describes the function of the adjustment device 1 in detail through exemplarily description of a more specific information processing system.

Second Embodiment

Figure 3:
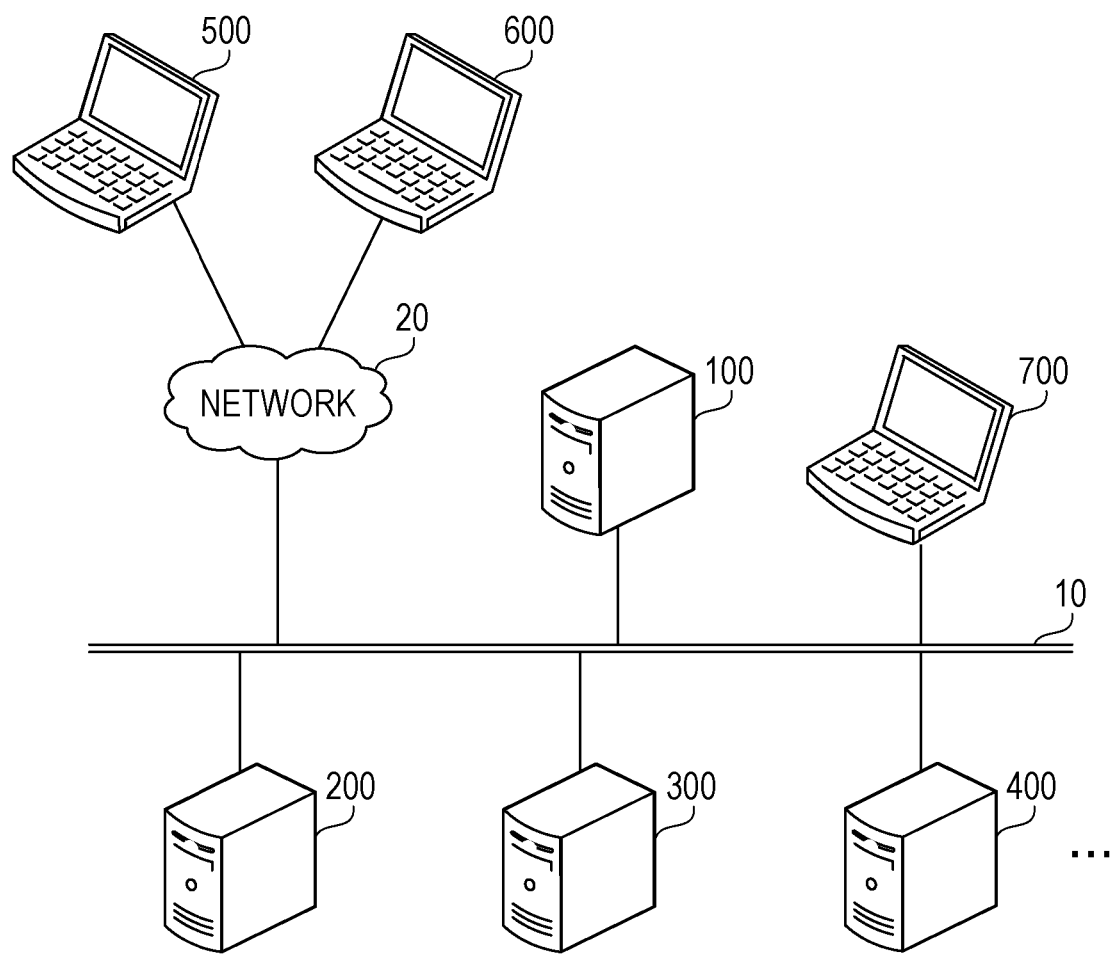
FIG. 3 is a diagram illustrating an exemplary information processing system according to a second embodiment.

FIG. 3 is a diagram illustrating an exemplary information processing system according to a second embodiment. The information processing system according to the second embodiment includes a management server 100 and physical machines 200, 300, 400, . . . . The management server 100 and the physical machines 200, 300, 400, . . . are connected with a network 10. The network 10 is, for example, a local area network (LAN). The network 10 is connected with a network 20. The network 20 is a network outside of the network 10, such as the Internet or a wide area network (WAN). The network 20 is connected with user terminals 500 and 600. The network 10 is connected with an operator terminal 700.

The information processing system according to the second embodiment provides what is called public cloud service. In the public cloud service, an operator of the system provides hardware resources on the system to a plurality of users (tenants) through a network. The users of the system establish virtual machines by using the provided hardware resources, and run various kinds of business applications on the virtual machines.

In the information processing system according to the second embodiment, maintenance on an infrastructure side (for example, security patch application and OS upgrade at the physical machines 200, 300, 400, . . . ) is performed to maintain service quality. Before the maintenance is performed on a physical machine, processing of migrating any virtual machine operating on the physical machine to another physical machine is performed. In an example described in the second embodiment, the live migration technology is used to migrate a virtual machine (however, the virtual machine migration may be achieved by cold migration).

The management server 100 is a server computer configured to manage a schedule of live migration of any virtual machine at the physical machines 200, 300, 400, . . . . Upon inputting of a physical machine as a maintenance target and a maintenance execution duration, the management server 100 produces a schedule of live migration of any virtual machine operating on the physical machine as a maintenance target. The management server 100 transmits the produced schedule to the user terminals 500 and 600 and the operator terminal 700. Upon confirmation of the produced schedule, the management server 100 instructs, in accordance with the confirmed schedule, the physical machine as a maintenance target to perform live migration of any virtual machine. The management server 100 is an exemplary adjustment device 1 according to the first embodiment.

The physical machines 200, 300, 400, . . . are server computers each including computational resources such as a CPU and a memory and configured to execute virtual machines by using the computation resources. For example, the physical machines 200, 300, 400, . . . each execute a hypervisor to allocate the computation resources to the virtual machines through the function of the hypervisor. The physical machines 200, 300, 400, . . . are exemplary physical machines 2, 3, 4, . . . according to the first embodiment.

The user terminals 500 and 600 are client computers used by users. The user terminals 500 and 600 are used by different users. The users use virtual machines on the physical machines 200, 300, 400, . . . by operating the respective user terminals 500 and 600. The user of the user terminal 500 may check, by using the user terminal 500, a schedule of live migration (live migration of a virtual machine used by the user), which is provided by the management server 100. Similarly, the user of the user terminal 600 may check a live migration schedule provided by the management server 100 by using the user terminal 600. The user terminals 500 and 600 are exemplary terminal devices 5 according to the first embodiment.

The operator terminal 700 is a client computer used by an operator (system administrator) of the information processing system according to the second embodiment. The operator uses the operator terminal 700 to check a physical-machine maintenance schedule provided by the management server 100 and a schedule of live migration along with maintenance.

Figure 4:
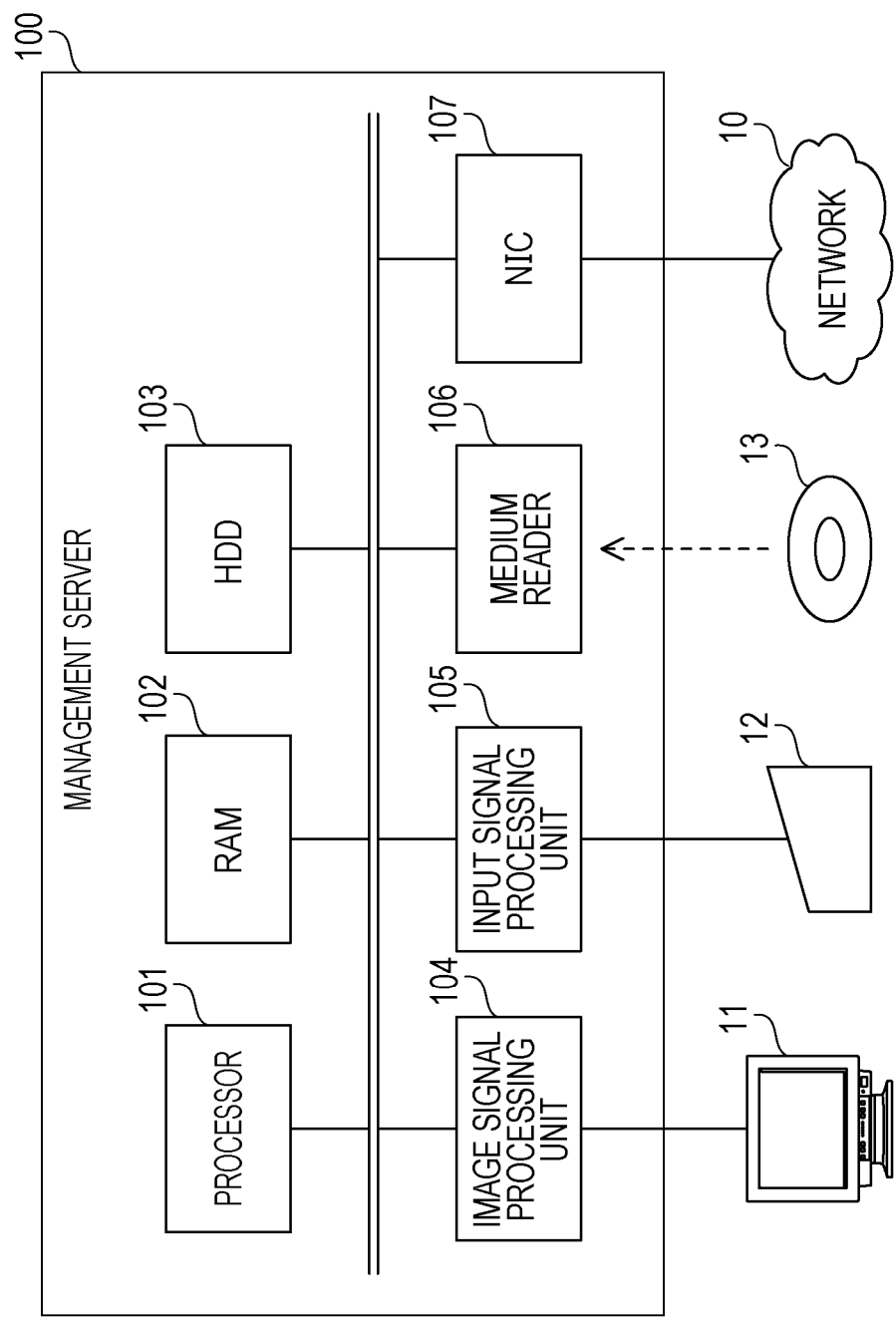
FIG. 4 is a diagram illustrating exemplary hardware of a management server.

FIG. 4 is a diagram illustrating exemplary hardware of the management server. The management server 100 includes a processor 101, a RAM 102, an HDD 103, an image signal processing unit 104, an input signal processing unit 105, a medium reader 106, and a network interface card (NIC) 107. Each hardware component is connected with a bus of the management server 100.

The processor 101 is a hardware component configured to control information processing at the management server 100. The processor 101 may be a multiprocessor. The processor 101 is a CPU, a DSP, an ASIC, an FPGA, or the like. The processor 101 may be a combination of two elements or more of the CPU, the DSP, the ASIC, the FPGA, or the like.

The RAM 102 is a main storage device of the management server 100. The RAM 102 temporarily stores at least part of an OS program and an application program executed by the processor 101. The RAM 102 also stores various kinds of data used for processing by the processor 101.

The HDD 103 is an auxiliary storage device of the management server 100. The HDD 103 magnetically writes and reads data to and from a built-in magnetic disk. The HDD 103 stores an OS program, an application program, and various kinds of data. The management server 100 may include an auxiliary storage device of another kind such as a flash memory or a solid state drive (SSD), and may include a plurality of auxiliary storage devices.

The image signal processing unit 104 outputs an image to a display 11 connected with the management server 100 in accordance with a command from the processor 101. The display 11 may be, for example, a cathode ray tube (CRT) display or a liquid crystal display.

The input signal processing unit 105 acquires an input signal from an input device 12 connected with the management server 100, and outputs the input signal to the processor 101. The input device 12 may be, for example, a pointing device such as a mouse or a touch panel, or a keyboard.

The medium reader 106 is a device configured to read computer programs and data recorded in a recording medium 13. The recording medium 13 may be, for example, a magnetic disk such as a flexible disk (FD) or an HDD, an optical disk such as a compact disc (CD) or a digital versatile disc (DVD), or a magneto-optical disc (MO). Alternatively, the recording medium 13 may be, for example, a non-transitory semiconductor memory such as a flash memory card. The medium reader 106 stores, in accordance with, for example, a command from the processor 101, computer programs and data read from the recording medium 13 in the RAM 102 or the HDD 103.

The NIC 107 performs communication with another device through the network 10. The NIC 107 may be a wired communication interface or a wireless communication interface.

The physical machines 200, 300, 400, . . . , the user terminals 500 and 600, and the operator terminal 700 may be achieved by using hardware components similarly to those of the management server 100.

Figure 5:
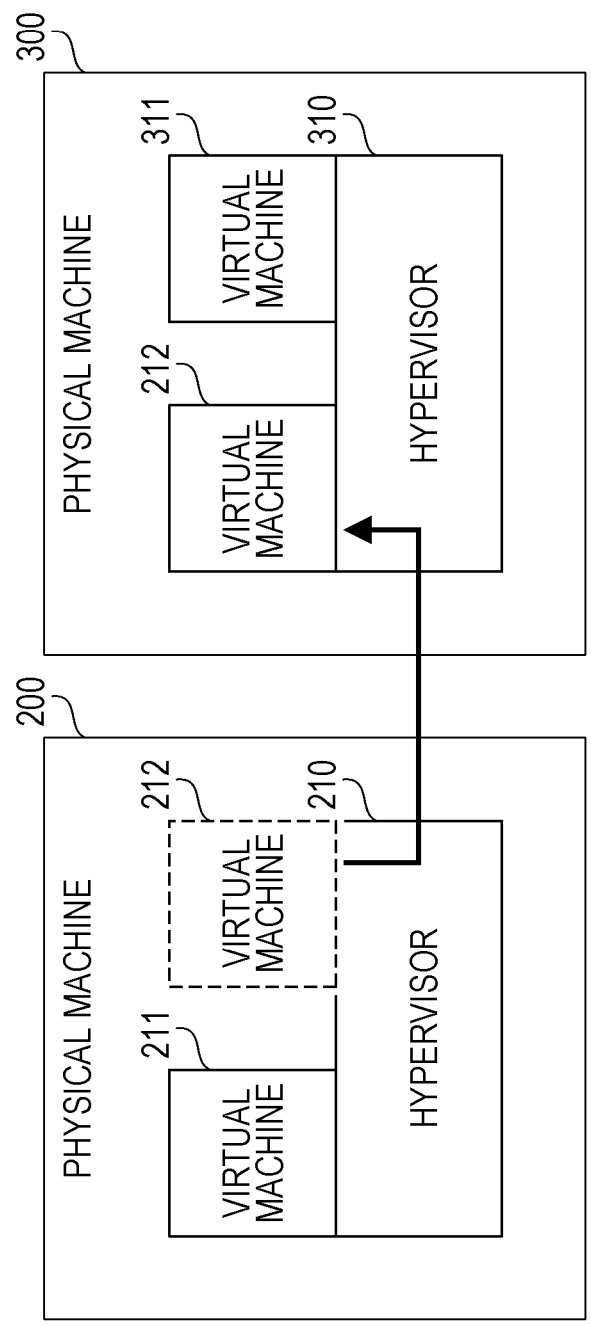
FIG. 5 is a diagram illustrating exemplary live migration.

FIG. 5 is a diagram illustrating exemplary live migration. The physical machines 200, 300, 400, . . . migrate a virtual machine between physical machines through the live migration. For example, the physical machine 200 includes a hypervisor 210 and virtual machines 211 and 212. The physical machine 300 includes a hypervisor 310 and a virtual machine 311. The hypervisor 210 allocates hardware resources such as a CPU and a memory included in the physical machine 200 to the virtual machines 211 and 212. Similarly, the hypervisor 310 allocates hardware resources included in the physical machine 300 to the virtual machine 311. For example, when the virtual machine 212 is migrated from the physical machine 200 to the physical machine 300, the following procedure is executed through live migration.

(1) CPU and memory resources for the virtual machine 212 as a migration target are reserved on the physical machine 300. (2) Data of a memory resource allocated to the virtual machine 212 as a migration target on the physical machine 200 is copied to a memory resource newly allocated to the virtual machine 212 on the physical machine 300. (3) The state of a CPU resource allocated to the virtual machine 212 is copied from the physical machine 200 to the physical machine 300, and the virtual machine 212 on the physical machine 200 is stopped. (4) The virtual machine 212 is resumed on the physical machine 300, and any resource allocated to the virtual machine 212 on the physical machine 200 is released. Accordingly, the virtual machine 212 operating on the physical machine 200 is migrated to the physical machine 300. The above-described procedure is also called Pre-Copy. However, another procedure such as Post-Copy may be used for live migration.

In the following description, live migration is also abbreviated as an LM.

Figure 6:
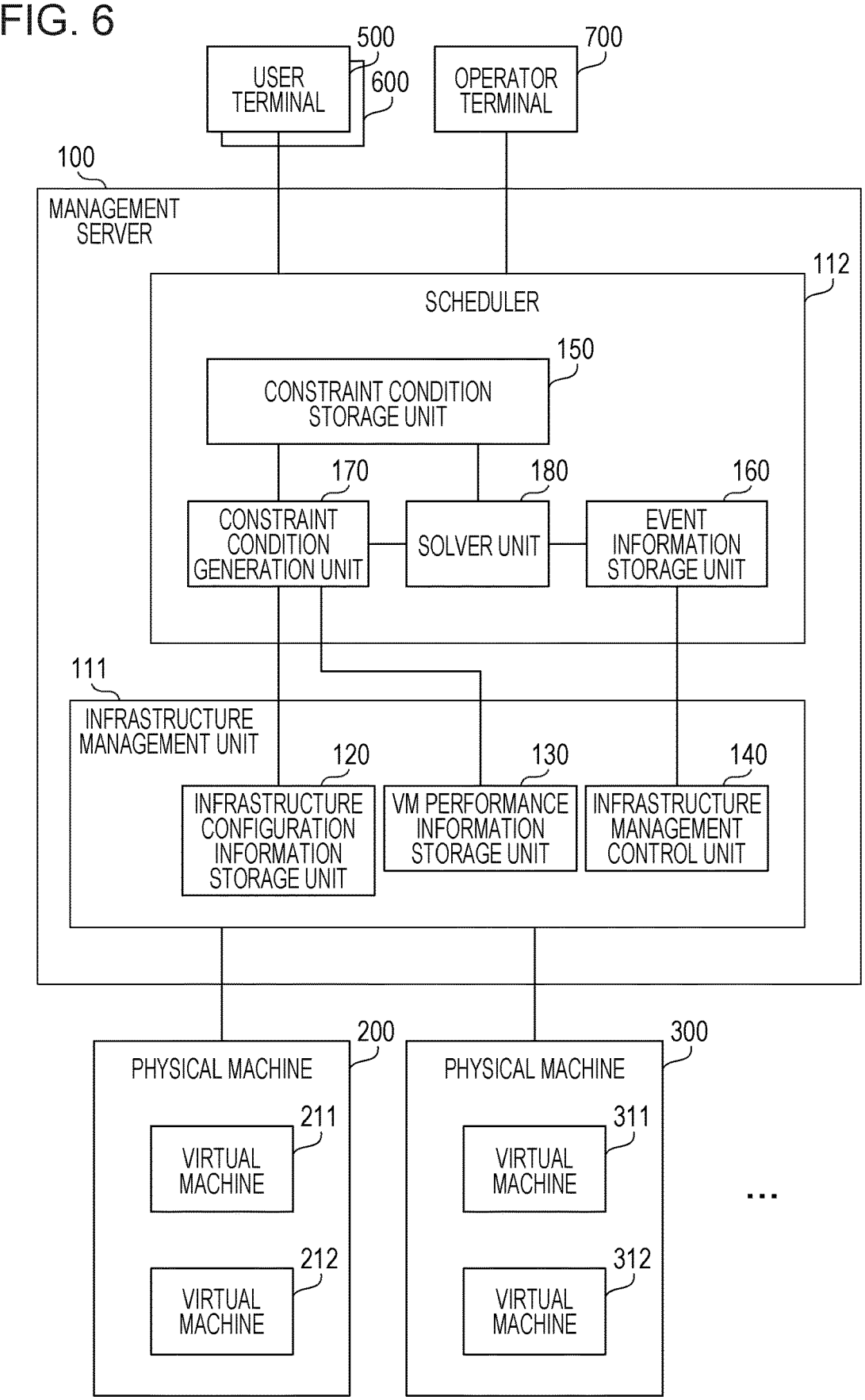
FIG. 6 is a diagram illustrating an exemplary function of the management server.

FIG. 6 is a diagram illustrating an exemplary function of the management server. The management server 100 includes an infrastructure management unit 111 and a scheduler 112. Functions of the infrastructure management unit 111 and the scheduler 112 are achieved by the processor 101. For example, the processor 101 achieves the functions of the infrastructure management unit 111 and the scheduler 112 by executing predetermined computer programs stored in the RAM 102. Alternatively, the infrastructure management unit 111 and the scheduler 112 may be each achieved by a hard wired logic such as an FPGA or an ASIC.

The infrastructure management unit 111 manages the hardware configuration of each physical machine and the configuration of resources allocated to each virtual machine. For example, the physical machine 200 includes virtual machines 211 and 212. The physical machine 300 includes virtual machines 311 and 312.

The infrastructure management unit 111 includes an infrastructure configuration information storage unit 120, a VM performance information storage unit 130, and an infrastructure management control unit 140. The infrastructure configuration information storage unit 120 and the VM performance information storage unit 130 are achieved by using, for example, storage regions of the RAM 102 and the HDD 103.

The infrastructure configuration information storage unit 120 stores infrastructure configuration information. The infrastructure configuration information is information related to the hardware configuration of each physical machine and the configuration of resources allocated to each virtual machine.

The VM performance information storage unit 130 stores VM performance information. The VM performance information is information related to performance of virtual machines, and includes information related to a turnaround time for LM (turnaround time predicted for LM at each time) of each virtual machine. The VM performance information also includes a history of a load on each virtual machine (history of a load on each virtual machine at each past time) used to obtain an LM turnaround time prediction result. LM turnaround time prediction based on the history of a load on each virtual machine may be performed by the management server 100.

The infrastructure management control unit 140 instructs virtual-machine LM to each physical machine in accordance with an LM schedule determined by the scheduler 112.

When physical-machine maintenance is to be performed, the scheduler 112 determines a schedule of LM of any virtual machine operating on a physical machine as a maintenance target. When having received a maintenance execution duration and information of the physical machine as a maintenance target from the operator terminal 700, the scheduler 112 determines an LM schedule based on information stored in the infrastructure configuration information storage unit 120 and the VM performance information storage unit 130.

The scheduler 112 includes a constraint condition storage unit 150, an event information storage unit 160, a constraint condition generation unit 170, and a solver unit 180. The constraint condition storage unit 150 and the event information storage unit 160 are achieved by using, for example, storage regions of the RAM 102 and the HDD 103.

The constraint condition storage unit 150 stores a constraint condition generated by the constraint condition generation unit 170.

The event information storage unit 160 stores information of an LM schedule of each virtual machine, which is produced by the solver unit 180, and information of a maintenance schedule of each physical machine.

The constraint condition generation unit 170 generates a constraint condition on LM schedule determination based on the infrastructure configuration information stored in the infrastructure configuration information storage unit 120 and the VM performance information stored in the VM performance information storage unit 130. The constraint condition generation unit 170 stores the generated constraint condition in the constraint condition storage unit 150.

The solver unit 180 tests LM schedule production by determining whether it is possible to perform scheduling so that the constraint condition generated by the constraint condition generation unit 170 is satisfied. The solver unit 180 stores, in the event information storage unit 160, an LM schedule that satisfies the generated constraint condition best.

The solver unit 180 may be, for example, an MILP solver or a satisfiability problem (SAT) solver. The MILP solver is disclosed in the following literature.

(Literature 1) J. P. Vielma, "Mixed Integer Linear Programming Formulation Techniques," SIAM Review, vol. 57, No. 1, pp. 3-57, 2015.

(Literature 2) Free Software Foundation, Inc., "GLPK (GNU Linear Programming Kit)," URL:http://www.gnu.org/software/glpk/glpk.html.

(Literature 3) Zuse Institute Berlin, "SCIP (Solving Constraint Integer Programs)," URL:http://scip.zib.de/.

(Literature 4) IBM Corporation, "IBM ILOG CPLEX Optimizer," URL:http://www-01.ibm.com/software/commerce/optimization/cplex-optimizer/index.html.

The SAT solver is disclosed in the following literature.

(Literature 5) C. P. Gomes, H. Kautz, A. Sabharwal, and B. Selman, "Satisfiability Solvers," in Handbook of Knowledge Representation (F. van Harmelen, V. Lifschitz, and B. Porter, eds.), pp. 89-134, Foundations of Artificial Intelligence, 2008.

(Literature 6) N. Een and N. Sorensson, "MiniSat," URL: http://minisat.se/Main.html.

(Literature 7) G. Audemard and L. Simon, "Glucose," URL:http://www.labri.fr/perso/lsimon/glucose/.

However, the solver unit 180 may be any solver other than the MILP solver and the SAT solver described above.

FIG. 7 is a diagram illustrating exemplary maintenance execution duration information. Maintenance execution duration information M1 is input to the scheduler 112 by the operator terminal 700. The maintenance execution duration information M1 is information of maintenance execution durations related to a plurality of physical machines included in the system. The maintenance execution duration information M1 includes the item of start date and time and the item of end date and time.

The start date and time of a maintenance execution duration is registered to the item of start date and time. The end date and time of a maintenance execution duration is registered to the item of end date and time. For example, the maintenance execution duration information M1 includes information such as the start date and time of "2017-06-01T12:00:00.000Z" and the end date and time of "2017-06-30T11:59:00.000Z". This indicates that the maintenance execution duration extends from 12:00 on Jun. 1, 2017 to 11:59 on Jun. 30, 2017.

Maintenance work on one physical machine is performed by using a time range in part of a maintenance execution duration. The management server 100 performs scheduling so that maintenance work on each physical machine is completed during an input maintenance execution duration.

For example, before maintenance work is performed on a first physical machine, the management server 100 migrates all virtual machines on the first physical machine to a second physical machine (the migration destination may be a plurality of physical machines) so that maintenance work is performed on the first physical machine.

Thereafter, maintenance work is performed on the second physical machine in some case. In such a case, the management server 100 migrates all virtual machines on the second physical machine to the first physical machine or a third physical machine (the migration destination may be a plurality of physical machines) so that maintenance work is performed on the second physical machine.

FIG. 8 is a diagram illustrating exemplary maintenance target machine information. Maintenance target machine information M2 is input to the scheduler 112 by the operator terminal 700. The maintenance target machine information M2 includes the item of physical machine name and the item of maintenance turnaround time.

The name of a physical machine is registered to the item of physical machine name. A time turnaround for maintenance of the physical machine is registered to the item of maintenance turnaround time. For example, the maintenance target machine information M2 includes information such as the physical machine name "PM01" and the maintenance turnaround time of "01:00:00.000". This indicates that a time turnaround for maintenance work on a physical machine indicated by the physical machine name "PM01" is one hour.

Similarly, the maintenance target machine information M2 registers a physical machine name and a maintenance turnaround time for another physical machine as a maintenance target.

Figure 9:
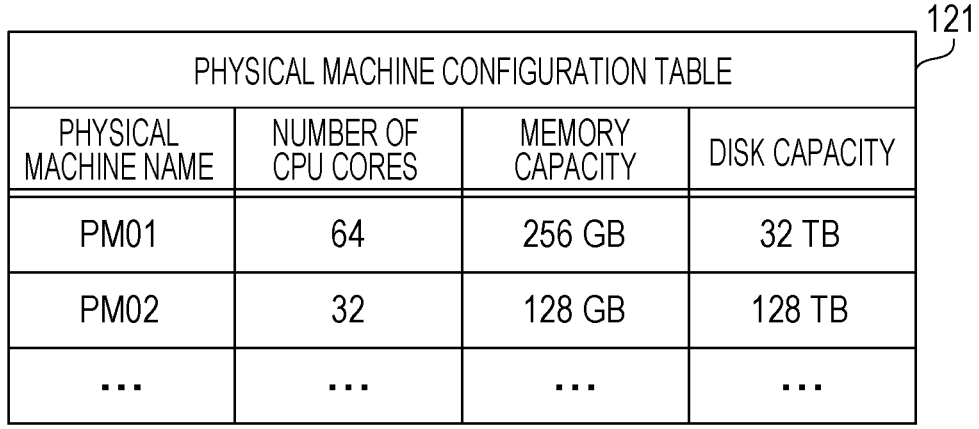
FIG. 9 is a diagram illustrating an exemplary physical machine configuration table.

FIG. 9 is a diagram illustrating an exemplary physical machine configuration table. A physical machine configuration table 121 is stored in the infrastructure configuration information storage unit 120 in advance. The physical machine configuration table 121 includes the item of physical machine name, the item of the number of CPU cores, the item of memory capacity, and the item of disk capacity.

The name of a physical machine is registered to the item of physical machine name. The number of CPU cores included in the physical machine is registered to the item of the number of CPU cores. The capacity of a memory (RAM) included in the physical machine is registered to the item of memory capacity. The capacity of an HDD included in the physical machine (or an auxiliary storage region allocated to an external storage for the physical machine) is registered to the item of disk capacity.

For example, the physical machine configuration table 121 registers a record with the physical machine name "PM01", the number of CPU cores of "64", the memory capacity of "256 GB", and the disk capacity of "32 TB". This record indicates that the number of CPU cores included in a physical machine indicated by the physical machine name "PM01" is 64, the memory capacity of the physical machine is 256 GB, and the disk capacity thereof is 32 TB.

Similarly, the physical machine configuration table 121 registers a physical machine name, the number of CPU cores, a memory capacity, and a disk capacity for another physical machine.

Figure 10:
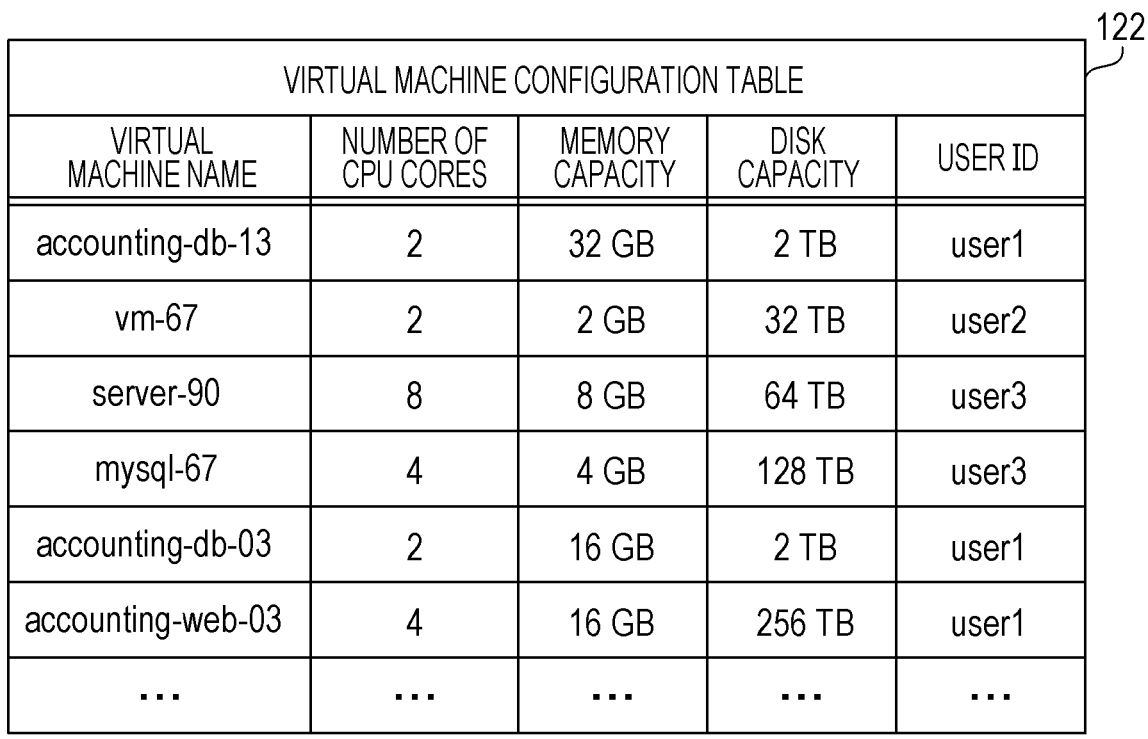
FIG. 10 is a diagram illustrating an exemplary virtual machine configuration table.

FIG. 10 is a diagram illustrating an exemplary virtual machine configuration table. A virtual machine configuration table 122 is stored in the infrastructure configuration information storage unit 120 in advance. The virtual machine configuration table 122 includes the item of virtual machine name, the item of the number of CPU cores, the item of memory capacity, the item of disk capacity, and the item of user identifier (ID).

The name of a virtual machine is registered to the item of virtual machine name. The number of CPU cores allocated to the virtual machine is registered to the item of the number of CPU cores. The capacity of a memory allocated to the virtual machine is registered to the item of memory capacity. The capacity of an HDD (or an auxiliary storage device of an external storage of the physical machine) allocated to the virtual machine is registered to the item of disk capacity.

For example, the virtual machine configuration table 122 registers a record with the virtual machine name "accounting-db-13", the number of CPU cores of "2", the memory capacity of "32 GB", the disk capacity of "2 TB", and the user ID of "user1". This record indicates that the number of CPU cores, the memory capacity, and the disk capacity allocated to a virtual machine indicated by the virtual machine name "accounting-db-13" are two, 32 GB, and 2 TB, respectively, and this virtual machine is used by a user with the user ID of "user1".

Similarly, the virtual machine configuration table 122 registers a virtual machine name, the number of CPU cores, a memory capacity, a disk capacity, and a user ID for another virtual machine.

FIG. 11 is a diagram illustrating an exemplary virtual machine operation table. A virtual machine operation table 123 is stored in the infrastructure configuration information storage unit 120 in advance. The virtual machine operation table 123 is information indicating a physical machine as an initial disposition target of each virtual machine. The virtual machine operation table 123 includes the item of a physical machine name, the item of a virtual machine name, and the item of a user ID.

The name of a physical machine is registered to the item of physical machine name. The name of a virtual machine operating on this physical machine is registered to the item of virtual machine name. The user ID of a user using this virtual machine is registered to the item of user ID.

For example, the virtual machine operation table 123 registers a record with the physical machine name "PM01", the virtual machine name "server-90", and the user ID of "user3". This record indicates that a virtual machine indicated by the virtual machine name "server-90" operates on a physical machine indicated by the physical machine name "PM01", and this virtual machine is used by a user with the user ID of "user3".

Similarly, the virtual machine operation table 123 registers the name of a physical machine as a disposition target, a virtual machine name, and a user ID for another virtual machine.

FIG. 12 is a diagram illustrating an exemplary dependency relation table. A dependency relation table 124 is stored in the infrastructure configuration information storage unit 120 in advance. The dependency relation table 124 is information indicating a dependency relation in a group of virtual machines. The dependency relation table 124 includes the item of group name, the item of virtual machine name, and the item of rule.

The name of a group of virtual machines is registered to the item of group name. A set of the names of virtual machines belonging to the group is registered to the item of virtual machine name. Information indicating whether the virtual machines belonging to the group are to be operated on an identical physical machine is registered to the item of rule. For example, the rule of "affinity" indicates operation on an identical physical machine (referred to as an affinity rule). The rule of "anti-affinity" indicates no operation on an identical physical machine (referred to as an anti-affinity rule).

For example, the dependency relation table 124 registers a record with the group name of "G01", the virtual machine names of "accounting-db-13" and "accounting-db-03", and the rule of "anti-affinity". This record indicates that two virtual machines having the virtual machine names of "accounting-db-13" and "accounting-db-03" belong to a group indicated by the group name of "G01" and are not to be operated on an identical physical machine.

For example, the dependency relation table 124 registers a record with the group name of "G02", the virtual machine names of "accounting-db-03" and "accounting-web-03", and the rule of "affinity". This record indicates that two virtual machines having the virtual machine names of "accounting-db-03" and "accounting-web-03" belong to a group indicated by the group name of "G02" are to be operated on an identical physical machine.

Similarly, the dependency relation table 124 registers a group name, a virtual machine name, and a rule for another group of virtual machines.

FIG. 13 is a diagram illustrating an exemplary LM turnaround time table. An LM turnaround time table 131 is stored in the VM performance information storage unit 130 in advance. The LM turnaround time table 131 includes the item of time, the item of virtual machine name, and the item of LM turnaround time.

Time is registered to the item of time. The name of a virtual machine is registered to the item of virtual machine name. A live migration (LM) turnaround time predicted for the corresponding virtual machine at the time is registered to the item of LM turnaround time.

For example, the LM turnaround time table 131 registers a record with the time "2017-06-20T09:00:00.000Z", the virtual machine name "server-90", and the LM turnaround time of "00:15:00.000". This record indicates that the LM turnaround time is 15 minutes when LM of a virtual machine having the virtual machine name "server-90" is completed between 9:00 and 9:59 on Jun. 20, 2017.

The LM turnaround time table 131 also registers a record with the time "2017-06-20T09:00:00.000Z", the virtual machine name "accounting-db-03", and the LM turnaround time of "00:30:00.000". This record indicates that the LM turnaround time is 30 minutes when LM of a virtual machine having the virtual machine name "accounting-db-03" is completed between 9:00 and 9:59 on Jun. 20, 2017.

The LM turnaround time table 131 also registers a record with the time "2017-06-20T10:00:00.000Z", the virtual machine name "server-90", and the LM turnaround time of "00:15:00.000. This record indicates that the LM turnaround time is 15 minutes when LM of a virtual machine having the virtual machine name "server-90" is completed between 10:00 and 10:59 on Jun. 20, 2017.

The LM turnaround time table 131 also registers a record with the time "2017-06-20T10:00:00.000Z", the virtual machine name "accounting-db-03", and the LM turnaround time of "00:20:00.000". This record indicates that the LM turnaround time is 20 minutes when LM of virtual machine having the virtual machine name "accounting-db-03" is completed between 10:00 and 10:59 on Jun. 20, 2017.

Similarly, the LM turnaround time table 131 registers a time, a virtual machine name, and an LM turnaround time for another time and another virtual machine.

FIG. 14 is a diagram illustrating an exemplary maintenance schedule table. A maintenance schedule table 161 is generated by the solver unit 180 and stored in the event information storage unit 160. The maintenance schedule table 161 includes the item of physical machine name, the item of start date and time, and the item of end date and time.

The name of a physical machine as a maintenance target is registered to the item of physical machine name. The start date and time of maintenance of the physical machine is registered to the item of start date and time. The end date and time of maintenance of the physical machine is registered to the item of end date and time.

For example, the maintenance schedule table 161 registers a record with the physical machine name "PM01", the start date and time of "2017-06-20T10:30:00.000Z", and the end date and time of "2017-06-20T11:29:00.000Z". This record indicates that maintenance of a physical machine having the physical machine name "PM01" is scheduled to be performed between 10:30 and 11:29 on Jun. 20, 2017.

Similarly, the maintenance schedule table 161 registers a physical machine name, start date and time, and end date and time for another physical machine as a maintenance target.

FIG. 15 is a diagram illustrating an exemplary LM schedule table. An LM schedule table 162 is generated by the solver unit 180 and stored in the event information storage unit 160. The LM schedule table 162 includes the item of virtual machine name, the item of start date and time, the item of end date and time, the item of migration source, the item of migration destination, and the item of state.

The name of a virtual machine as an LM target is registered to the item of virtual machine name. The start date and time of LM of the virtual machine is registered to the item of start date and time. The end date and time of LM of the virtual machine is registered to the item of end date and time. The name (physical machine name) of a physical machine as an LM migration source is registered to the item of migration source. The name (physical machine name) of a physical machine as an LM migration destination is registered to the item of migration destination. Information indicating whether a schedule indicated by the start date and time of the LM and the end date and time of the LM is "confirmed" or "yet to be confirmed" is registered to the item of state. The item of state has an initial value of "yet to be confirmed".

For example, the LM schedule table 162 registers a record with the virtual machine name "server-90", the start date and time of "2017-06-20T09:45:00.000Z", the end date and time of "2017-06-20T09:59:00.000Z", the migration source of "PM01", the migration destination of "PM02", and the state of "confirmed".

This record indicates that LM of the virtual machine name "server-90" starts at 9:45 on Jun. 20, 2017 and ends at 9:59 on Jun. 20, 2017. The record also indicates that the migration source of the LM is a physical machine having the physical machine name "PM01", the migration destination of the LM is a physical machine having the physical machine name "PM02", and the schedule of the LM is confirmed by a user.

The LM schedule table 162 also registers a virtual machine name, start date and time, end date and time, a migration source, a migration destination, and a state for another virtual machine.

The contents of the item of virtual machine name, the item of start date and time, and the item of end date and time in the LM schedule table 162 are presented to the user. The contents of the item of virtual machine name, the item of start date and time, the item of end date and time, the item of migration source, and the item of migration destination in the LM schedule table 162 are presented to the operator.

FIG. 16 is a diagram illustrating exemplary LM execution refusal date and time information. LM execution refusal date and time information M3 is input to the scheduler 112 by the user terminals 500 and 600. The LM execution refusal date and time information M3 includes the item of virtual machine name, the item of start date and time, and the item of end date and time.

The name of a virtual machine is registered to the item of virtual machine name. The start date and time of a duration (LM execution refusal duration) in which LM execution is refused is registered to the item of start date and time. The end date and time of the LM execution refusal duration is registered to the item of end date and time. For example, the LM execution refusal date and time information M3 includes information such as the virtual machine name "mysql-67", the start date and time of "2017-06-20T11:00:00.000Z", and the end date and time of "2017-06-20T13:59:00.000Z". This indicates that the LM execution refusal duration of a virtual machine having the virtual machine name "mysql-67" extends from 11:00 on Jun. 20, 2017 to 13:59 on Jun. 20, 2017.

Similarly, the LM execution refusal date and time information M3 may include for another virtual machine, a virtual machine name, start date and time, and end date and time.

FIG. 17 is a diagram illustrating exemplary variables in a constraint satisfaction problem. The constraint condition generation unit 170 sets values included in the information exemplarily illustrated in FIGS. 7 to 13 (the information illustrated in FIG. 16 is included in some cases) as inputs to the constraint satisfaction problem. The solver unit 180 outputs the maintenance schedule table 161 exemplarily illustrated in FIG. 14 and the LM schedule table 162 exemplarily illustrated in FIG. 15 by solving the constraint satisfaction problem, and stores the tables in the event information storage unit 160.

For example, input variables are as follows.

The variable $t_s$ is the start date and time of a maintenance execution duration. The variable $t_e$ is the end date and time of the maintenance execution duration. The variable $T = \{t_s, \ldots, t_e\}$ is a set of times obtained by discretizing the maintenance execution duration into units of minutes. A duration from a time in T until right before the next time (time one minute later) is referred to as one time slot. The values of time $t_s$ and time $t_e$ are obtained from the maintenance execution duration information M1.

The variable P is a set of physical machines (PM) as maintenance targets. The variable $\text{maintDuration}_p$ is the maintenance turnaround time of a physical machine p (PMp). The index p indicates a physical machine as a maintenance target. The values of P and $\text{maintDuration}_p$ are obtained from the maintenance target machine information M2.

The variable $\text{cpuCap}_p$ is the number of CPU cores of PMp. The variable $\text{ramCap}_p$ is the memory capacity of PMp. The variable $\text{diskCap}_p$ is the disk capacity of PMp. The values of $\text{cpuCap}_p$, $\text{ramCap}_p$, and $\text{diskCap}_p$ are obtained from the physical machine configuration table 121.

The variable V represents a set of virtual machines (VM) as LM schedule adjustment targets. The variable $\text{initAccommo}_{p,v}$ represents initial disposition of a virtual machine v (VMv), and indicates one when an initial disposition target of VMv is PMp, or zero otherwise. The index v indicates a virtual machine as an LM target. The variable V represents a set of virtual machines associated with a physical machine specified by the maintenance target machine information M2 among virtual machines registered to the virtual machine operation table 123. The value of $\text{initAccommo}_v$ is obtained from the virtual machine operation table 123.

The variable $\text{migrationDuration}_v(t)$ represents the LM turnaround time of VMv at time t. The value of $\text{migrationDuration}_v(t)$ is obtained from the LM turnaround time table 131.

The variable $\text{cpuReq}_v$ represents the number of CPU cores of VMv. The variable $\text{ramReq}_v$ represents the memory capacity of VMv. The variable $\text{diskReq}_v$ represents the disk capacity of VMv. The values of $\text{cpuReq}_v$, $\text{ramReq}_v$, and $\text{diskReq}_v$ are obtained from the virtual machine configuration table 122.

The variable availMigrationTimeSlot$_v$(t) represents LM execution allowed date and time (or LM execution refusal date and time), and indicates one when LM execution of VMv is allowed at time t, or zero otherwise. The value of availMigrationTimeSlot$_v$(t) is obtained from the LM execution refusal date and time information M3 (zero at a time belonging to the LM execution refusal date and time, or one otherwise).

The variable numG$_{af}$ represents the number of groups to which the affinity rule is applied. The variable G$_{af}$={G$_{af\_1}$, . . . , G$_{af\_numGaf}$} represents a set of groups to which the affinity rule is applied. The variable numG$_{aa}$ represents the number of groups to which the anti-affinity rule is applied. The variable G$_{aa}$={G$_{aa\_1}$, . . . , G$_{aa\_numGaa}$} represents a set of groups to which the anti-affinity rule is applied. The values of numG$_{af}$, G$_{af}$, numG$_{aa}$, and G$_{aa}$ are obtained from the dependency relation table 124.

For example, output variable are as follows.

The variable m$_p$(t) represents a maintenance execution duration per PM, and indicates one when PMp is under maintenance at time t, or zero otherwise. The variable m$_p$(t) is used to produce the maintenance schedule table 161.

The variable a$_{pv}$(t) represents a physical machine as a VM disposition target, and indicates one when VMv is operating on PMp at time t, or zero otherwise. The variable l$_{pv}$(t) represents switching of VM disposition targets through LM, and indicates one when LM of VMv to PMp is completed at time t, or zero otherwise. The variables a$_{pv}$(t) and l$_{pv}$(t) are used to produce the LM schedule table 162.

The following exemplarily describes expression of LM with the above-described variables migrationDuration$_v$(t), l$_{pv}$(t), and a$_{pv}$(t).

Figures 18A, 18B, 18C:
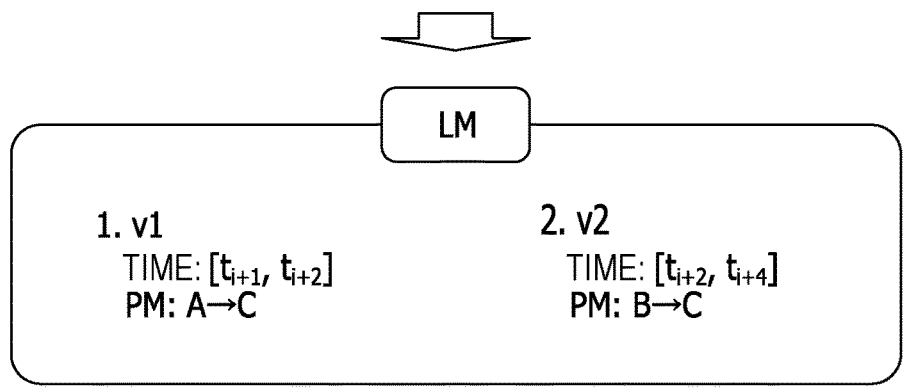
FIGS. 18A, 18B, and 18C are diagrams illustrating exemplary LM expression with variables.

FIGS. 18A, 18B, and 18C are diagrams illustrating exemplary expression of LM with variables. FIG. 18A exemplarily illustrates migrationDuration$_v$ for virtual machines v1 and v2 at times t$_i$, t$_{i+1}$, . . . , t$_{i+5}$.

For example, migrationDuration$_{v1}$(t$_{i+2}$) is two. This indicates that two time slots are used to complete LM of the virtual machine v1 at time t$_{i+2}$.

For example, migrationDuration$_{v2}$(t$_{i+4}$) is three. This indicates that three time slots are used to complete LM of the virtual machine v2 at time t$_{i+4}$.

FIG. 18B exemplarily illustrates l$_{pv}$ (p=C) for the virtual machines v1 and v2 at times t$_i$, t$_{i+1}$, . . . , t$_{i+5}$.

For example, l$_{pv1}$(t$_{i+2}$) is one, and l$_{pv1}$(t) is zero at any other time. This indicates that LM of the virtual machine v1 to a physical machine C is completed at time t$_{i+2}$. As illustrated in FIG. 18A, two time slots are used to complete LM of the virtual machine v1 at time t$_{i+2}$. Accordingly, LM of the virtual machine v1 is executed in a duration of two time slots indicated by times t$_{i+1}$ and t$_{i+2}$.

For example, l$_{pv2}$(t$_{i+4}$) is one, and l$_{pv2}$(t) is zero at any other time. This indicates that LM of the virtual machine v2 to the physical machine C is completed at time t$_{i+4}$. As illustrated in FIG. 18A, three time slots are used to complete LM of the virtual machine v2 at time t$_{i+4}$. Accordingly, LM of the virtual machine v2 is executed in a duration of three time slots indicated by times t$_{i+2}$, t$_{i+3}$, and t$_{i+4}$.

FIG. 18C exemplarily illustrates p (physical machine) with a$_{pv}$(t)=1 for the virtual machines v1 and v2 at times t$_i$, t$_{i+1}$, . . . , t$_{i+5}$.

For example, p with a$_{pv1}$(t)=1 is a physical machine A (the migration source of LM of the virtual machine v1) at times t$_i$, t$_{i+1}$, and t$_{i+2}$. Then, as exemplarily illustrated in FIG. 18B, LM of the virtual machine v1 to the physical machine C is completed at time t$_{i+2}$. Accordingly, p with a$_{pv1}$(t)=1 is the physical machine C at time t$_{i+3}$ or later.

For example, p with a$_{pv2}$(t)=1 is a physical machine B (the migration source of LM of the virtual machine v2) at times t$_i$, t$_{i+1}$, . . . , t$_{i+4}$. Then, as exemplarily illustrated in FIG. 18B, LM of the virtual machine v2 to the physical machine C is completed at time t$_{i+4}$. Accordingly, p with a$_{pv2}$(t)=1 is the physical machine C at time t$_{i+5}$ or later.

Thus, the following contents for LM of the virtual machines v1 and v2 are expressed by the variables migrationDuration$_v$(t), l$_{pv}$(t), and a$_{pv}$(t).

For the virtual machine v1, the LM execution duration is time [t$_{i+1}$, t$_{i+2}$] (from time t$_{i+1}$ to time t$_{i+2}$), the migration source is the physical machine A, and the migration destination is the physical machine C.

For the virtual machine v2, the LM execution duration is time [t$_{i+2}$, t$_{i+4}$] (from time t$_{i+2}$ to time t$_{i+4}$), the migration source is the physical machine A, and the migration destination is the physical machine C.

The constraint condition generation unit 170 generates a constraint condition using the variables exemplarily described above. The solver unit 180 produces the maintenance schedule table 161 and the LM schedule table 162 by solving a constraint satisfaction problem related to the generated constraint condition.

The following describes an exemplary constraint condition generated by the constraint condition generation unit 170.

A first constraint condition is such that VMv activates on PMp as an initial disposition target. The first constraint condition is expressed by Expression (2).

$$a_{pv}(t_s) = \text{initAccommo}_{pv}, \forall p \in P, \forall v \in V \quad (2)$$

A second constraint condition is such that maintenance is once performed on PMp. The second constraint condition is expressed by Expressions (3) and (4). In particular, Expression (3) indicates that a continuous maintenance duration equal to or longer than maintDuration$_p$ is allocated to each PMp. Expression (4) indicates that the sum of the maintenance durations is equal to maintDuration$_p$.

$$\sum_{i=2}^{\text{maintDuration}_p} m_p(t-i) - (\text{maintDuration}_p - 1)m_p(t-1) + (\text{maintDuration}_p - 1)m_p(t) \geq 0, \forall p \in P, \forall t \in T - \{t_s\} \quad (3)$$

$$\sum_{t \in T} m_p(t) = \text{maintDuration}_p, \forall p \in P \quad (4)$$

A third constraint condition is such that the number of PMs on which maintenance is allowed to be performed all at once is equal to or smaller than C$_m$. The constant C$_m$ is predetermined in accordance with the system. The third constraint condition is expressed by Expression (5).

$$\sum_{p \in P} m_p(t) \leq C_m, \forall t \in T \quad (5)$$

A fourth constraint condition is such that VMv constantly operates on any PMp. The fourth constraint condition is expressed by Expression (6).

$$\sum_{p \in P} a_{pv}(t) = 1, \forall v \in V, \forall t \in T \quad (6)$$

A fifth constraint condition is such that the sum of a required resource amount of each VM operating on PMp is equal to or smaller than a provided resource amount of PMp and no VM operates on PMp while maintenance is perform on PMp. The fifth constraint condition is expressed by Expressions (7), (8), and (9). In particular, Expression (7) indicates a constraint condition related to the number of CPU cores. Expression (8) indicates a constraint condition related to a memory capacity. Expression (9) indicates a constraint condition related to a disk capacity.

$$\sum_{v \in V} cpuReq_v \cdot a_{pv}(t) \leq \{1 - m_p(t)\}cpuCap_p, \forall p \in P, \forall t \in T \quad (7)$$

$$\sum_{v \in V} ramReq_v \cdot a_{pv}(t) \leq \{1 - m_p(t)\}ramCap_p, \forall p \in P, \forall t \in T \quad (8)$$

$$\sum_{v \in V} diskReq_v \cdot a_{pv}(t) \leq \{1 - m_p(t)\}diskCap_p, \forall p \in P, \forall t \in T \quad (9)$$

A sixth constraint condition is such that a time in which VMv operates on PMp is equal to or longer than migrationDuration$_v$(t)+1. The sixth constraint condition is expressed by Expression (10). The sixth constraint condition reflects that VMv is continuously operational for LM in a duration equal to or longer than migrationDuration$_v$(t)+1. The "+1" (addition of one) to migrationDuration$_v$(t) is performed because it is unlikely that another LM is performed right after LM is completed.

$$\{migrationDuration_v(t) + 1\}[a_{pv}(t) \cap \{1 - a_{pv}(t+1)\}] \leq \quad (10)$$

$$\sum_{i=0}^{migrationDuration_v(t)} a_{pv}(t-i), \forall p \in P, \forall v \in V, \forall t \in T - \{t_e\}$$

A seventh constraint condition indicates detection of live migration. The seventh constraint condition is expressed by Expression (11). The variable $l_{pv}(t)$ is one when live migration of VMv to PMp is completed at time t, or zero otherwise.

$$\{1-a_{pv}(t)\} \cap a_{pv}(t+1) = l_{pv}(t), \forall p \in P, \forall v \in V, \forall t \in T - \{t_e\} \quad (11)$$

An eighth constraint condition is such that LM of VMv is performed only in an allowed duration. The eighth constraint condition is expressed by Expression (12).

$$\sum_{i=0}^{migrationDuration_v(t)-1} availMigrationTimeSlot_v(t-i) - \quad (12)$$

$$migrationDuration_v(t) \sum_{p \in P} l_{pv}(t) \geq 0, \forall v \in V, \forall t \in T$$

A ninth constraint condition is such that live migration to PMp under maintenance is disallowed. The ninth constraint condition is expressed by Expression (13).

$$migrationDuration_v(t) \cdot l_{pv}(t) \leq \sum_{i=0}^{migrationDuration_v(t)-1} \{1 - m_p(t-i)\}, \quad (13)$$

$$\forall p \in P, \forall v \in V, \forall t \in T$$

A tenth constraint condition is such that the number of VMs, LM of which is allowed to be performed all at once is equal to or smaller than $C_l$. The constant $C_l$ is predetermined in accordance with the system. The tenth constraint condition is expressed by Expression (14).

$$\sum_{i=0}^{migrationDuration_v(t)-1} \sum_{p \in P} \sum_{v' \in V} l_{pv'}(t-i) \leq C_l, \forall v \in V, \forall t \in T \quad (14)$$

An eleventh constraint condition is such that each VM belonging to a group to which the anti-affinity rule is applied is disallowed to operate on an identical PM. The eleventh constraint condition is expressed by Expression (15).

$$\sum_{v \in G_{aa\_i}} a_{pv}(t) \leq 1, \forall p \in P, \forall t \in T, \forall i \in \{1, \ldots, numG_{aa}\} \quad (15)$$

A twelfth constraint condition is such that each VM belonging to a group to which the affinity rule is applied is operated on an identical PM. The twelfth constraint condition is expressed by Expression (16).

$$\left\{\sum_{v \in G_{af\_i}} a_{pv}(t)\right\} mod |G_{af\_i}| = 0, \forall p \in P, \quad (16)$$

$$\forall t \in T, \forall i \in \{1, \ldots, numG_{af}\}$$

A thirteenth constraint condition is an objective function of a constraint satisfaction problem, and minimization of the LM turnaround time (in other words, a time in which business of a user is affected) of each VM. The thirteenth constraint condition is expressed by Expression (17).

$$\min \sum_{p \in P} \sum_{v \in V} \sum_{t \in T} migrationDuration_v(t) \cdot l_{pv}(t) \quad (17)$$

The following describes the procedure of processing performed by the management server 100.

Figure 19:
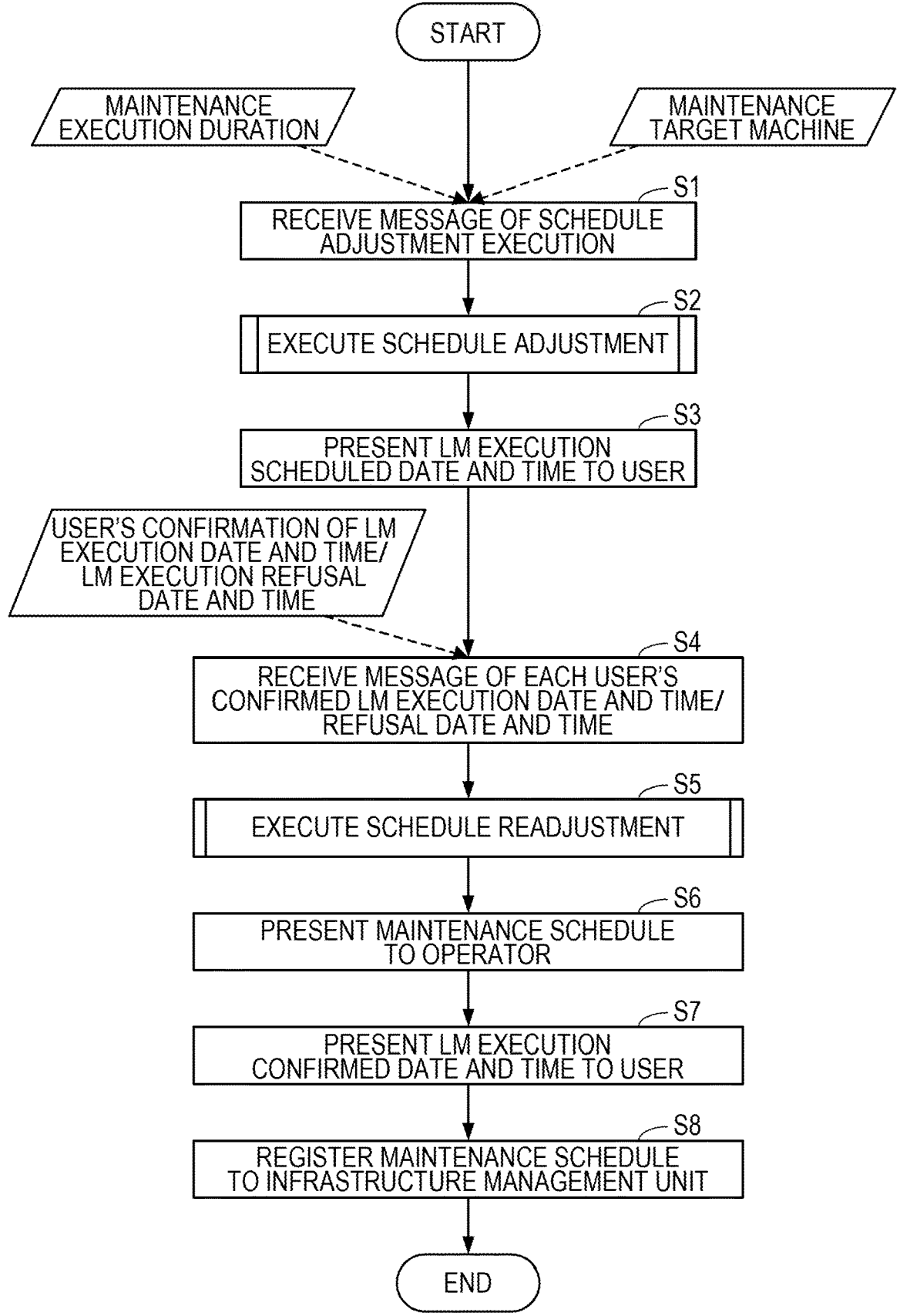
FIG. 19 is a flowchart illustrating exemplary processing at the management server.

FIG. 19 is a flowchart illustrating exemplary processing performed by the management server. The processing illustrated in FIG. 19 will be described with reference to step numbers.

(S1) The scheduler 112 receives a message of execution of maintenance and LM schedule adjustment from the operator terminal 700. This message includes the maintenance execution duration information M1 and the maintenance target machine information M2.

(S2) The scheduler 112 executes processing of the maintenance schedule adjustment. The schedule adjustment processing will be described in detail later. Through the schedule adjustment, the scheduler 112 produces the maintenance schedule table 161 of each physical machine and the LM schedule table 162 of each virtual machine.

(S3) The scheduler 112 presents LM execution scheduled date and time to a user based on the produced LM schedule. Specifically, the scheduler 112 produces, for each user, screen information indicating the LM execution scheduled date and time of a virtual machine used by the user, and transmits the produced screen information to a user terminal of the user. In this case, the scheduler 112 transmits, together with the LM execution scheduled date and time to the user terminal, information indicating a load (predicted load) on the virtual machine predicted for each time included in the LM execution scheduled date and time. The screen information transmitted by the scheduler 112 is received by the user terminal. The user terminal displays a screen indicating the LM execution scheduled date and time of the virtual machine (including the predicted load on the virtual machine at each time) based on the screen information. The scheduler 112 identifies a user of each virtual machine based on the item of user ID in the virtual machine configuration table 122 and the virtual machine operation table 123.

(S4) The scheduler 112 receives confirmation of the LM execution date and time by each user or a message of refusal date and time. The message of refusal date and time includes the LM execution refusal date and time information M3.

(S5) The scheduler 112 executes processing of maintenance and LM schedule readjustment. The schedule readjustment processing will be described in detail later. The scheduler 112 updates the maintenance schedule table 161 and the LM schedule table 162 in accordance with the schedule readjustment.

(S6) The scheduler 112 presents maintenance schedule to the operator. Specifically, the scheduler 112 produces screen information indicating an LM schedule of each virtual machine and a maintenance schedule of each physical machine based on the maintenance schedule table 161 and the LM schedule table 162. The scheduler 112 transmits the produced screen information to the operator terminal 700.

(S7) The scheduler 112 presents LM execution confirmed date and time to the user. Specifically, the scheduler 112 produces, for each user, screen information indicating the LM schedule of a virtual machine used by the user based on the LM schedule table 162. The scheduler 112 transmits the produced screen information to a user terminal of the user. The scheduler 112 may execute steps S6 and S7 in an optional order.

(S8) The scheduler 112 registers the produced maintenance schedule to the infrastructure management unit 111. Specifically, the scheduler 112 sets the infrastructure management unit 111 so that LM of each virtual machine is performed based on a schedule indicated in the LM schedule table 162.

The infrastructure management unit 111 instructs LM of each virtual machine to the physical machines 200, 300, 400, . . . in accordance with the schedule. Specifically, the management server 100 instructs LM (migration) of the virtual machine to a physical machine as a maintenance target based on the produced LM schedule table 162 (schedule information). This improves the efficiency of maintenance work of the physical machine by the operator.

Figure 20:
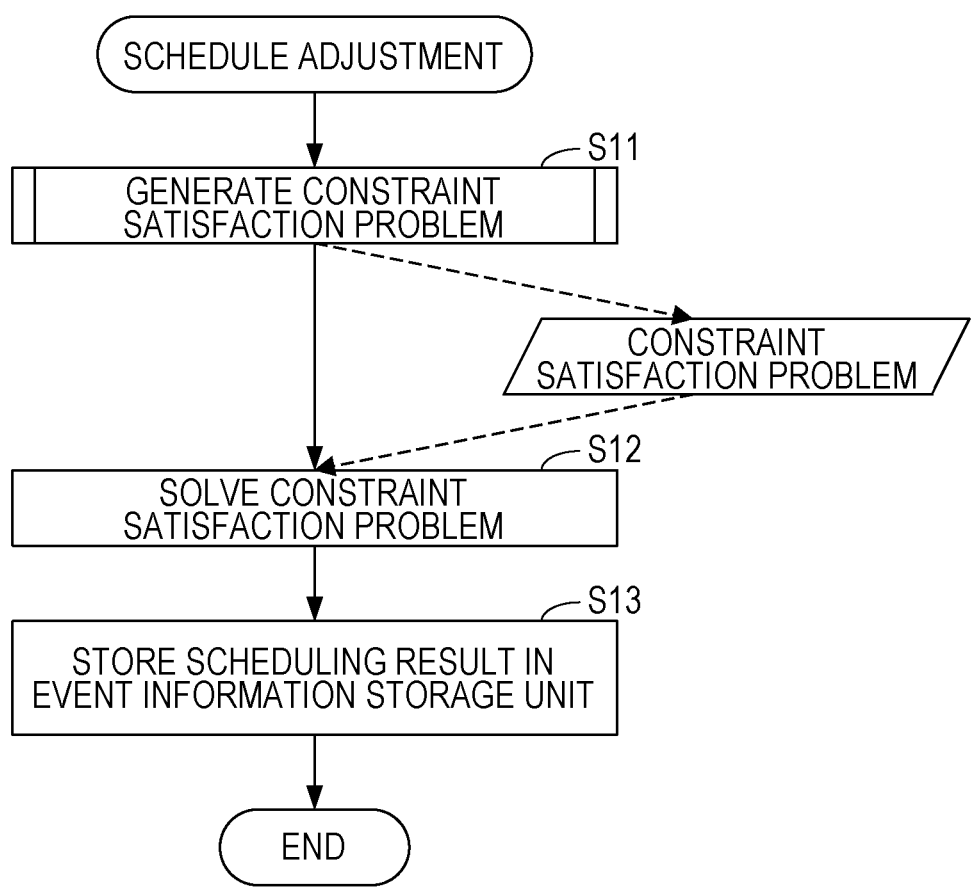
FIG. 20 is a flowchart illustrating exemplary schedule adjustment.

FIG. 20 is a flowchart illustrating exemplary schedule adjustment. The processing illustrated in FIG. 20 will be described with reference to step numbers. A procedure described below corresponds to step S2 in FIG. 19.

(S11) The constraint condition generation unit 170 executes constraint satisfaction problem generation processing. The constraint satisfaction problem generation processing will be described in detail later. Through the constraint satisfaction problem generation processing, the constraint condition generation unit 170 outputs a constraint satisfaction problem including a plurality of constraint conditions.

(S12) The solver unit 180 solves the constraint satisfaction problem output at step S11 to calculate the value of each output variable at each time in the maintenance execution duration.

(S13) The solver unit 180 produces, as a scheduling result, the maintenance schedule table 161 and the LM schedule table 162 based on the value of each output variable at each time in the maintenance execution duration. The solver unit 180 stores the scheduling result in the event information storage unit 160. At this stage, the item of state in the LM schedule table 162 is "yet to be confirmed".

The solver unit 180 determines a schedule of performing maintenance on a physical machine as a maintenance target in a duration after all virtual machines operating on the physical machine are migrated to another physical machine in the maintenance execution duration. For example, the solver unit 180 may set, as a duration in which maintenance is performed on the physical machine, a duration (duration in a length corresponding to the maintenance turnaround time) right after all virtual machines operating on the physical machine as a maintenance target are migrated to another physical machine.

Figure 21:
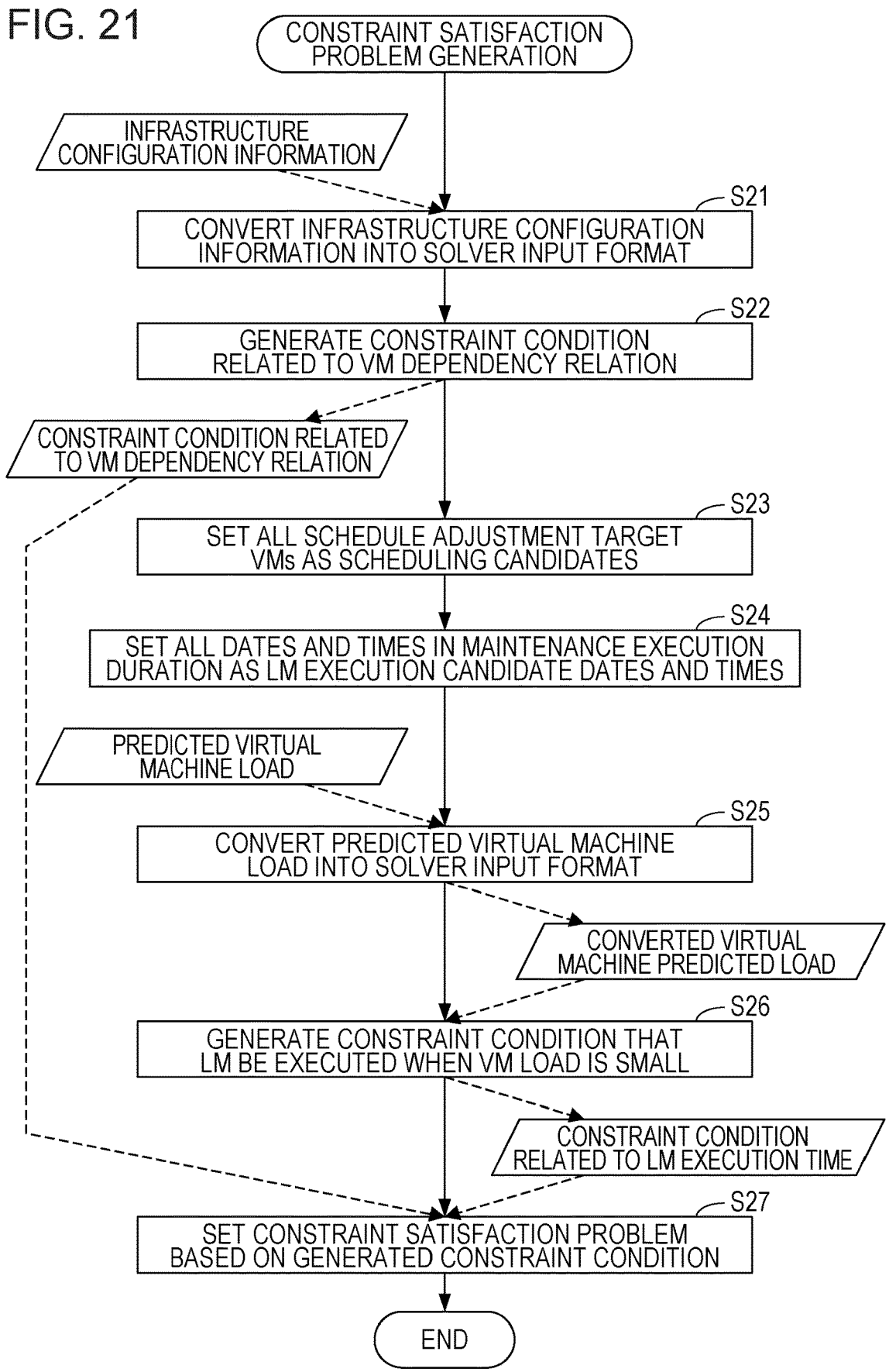
FIG. 21 is a flowchart illustrating exemplary generation of a constraint satisfaction problem.

FIG. 21 is a flowchart illustrating exemplary constraint satisfaction problem generation. The processing illustrated in FIG. 21 will be described below with reference to step numbers. A procedure described below corresponds to step S11 in FIG. 20.

(S21) The constraint condition generation unit 170 converts the infrastructure configuration information stored in the infrastructure configuration information storage unit 120 into the format of inputting to the solver unit 180. As described above, the infrastructure configuration information includes the physical machine configuration table 121, the virtual machine configuration table 122, the virtual machine operation table 123, and the dependency relation table 124. The constraint condition generation unit 170 converts information of these tables into the format of data input to the solver unit 180.

(S22) The constraint condition generation unit 170 generates a constraint condition related to a virtual machine (VM) dependency relation. The constraint condition related to the VM dependency relation is, for example, the above-described first, fourth, fifth, eleventh, and twelfth constraint conditions. The constraint condition generation unit 170 stores the generated constraint condition in the constraint condition storage unit 150.

(S23) The constraint condition generation unit 170 sets all virtual machines (VMs) as LM schedule adjustment targets to be scheduling candidates. Each virtual machine as a schedule adjustment target is a virtual machine operating on a physical machine specified by the maintenance target machine information M2. Any virtual machine operating on another physical machine is not an LM schedule adjustment target.

(S24) The constraint condition generation unit 170 sets all dates and times in the maintenance execution duration to be LM execution candidate dates and times. For example, the constraint condition generation unit 170 sets $T=\{t_s, \ldots, t_e\}$ based on the maintenance execution duration information M1. The constraint condition generation unit 170 also sets availMigrationTimeSlot$_v$(t)=1 for all t belonging to T.

(S25) The constraint condition generation unit 170 converts a virtual machine predicted load stored in the VM performance information storage unit 130 into the format of inputting to the solver unit 180. The virtual machine predicted load is the LM turnaround time table 131 stored in the VM performance information storage unit 130. The LM turnaround time table 131 includes the LM turnaround time of each virtual machine corresponding to each time in a maintenance execution duration (T). The constraint condition generation unit 170 converts information of the LM turnaround time table 131 into the format of data input to the solver unit 180 (converted virtual machine predicted load). The LM turnaround time tends to be longer for a larger virtual machine load, and shorter for a smaller virtual machine load. Thus, the LM turnaround time is information reflected on a result of virtual machine load prediction.

(S26) The constraint condition generation unit 170 generates, based on the converted virtual machine predicted load, a constraint condition (constraint condition related to an LM execution time) so that LM is performed when the virtual machine (VM) load is small (in other words, when the LM turnaround time of each virtual machine is small). The constraint condition related to the LM execution time is, for example, the above-described second, third, sixth to tenth, and thirteenth constraint conditions. At this stage, the eighth constraint condition is such that LM is allowed to be performed in the entire maintenance execution duration for each virtual machine (availMigrationTimeSlot$_v$(t)=1 for all t). The constraint condition generation unit 170 stores the generated constraint condition in the constraint condition storage unit 150.

(S27) The constraint condition generation unit 170 sets a constraint satisfaction problem based on the constraint conditions generated at steps S22 and S26.

Figure 22:
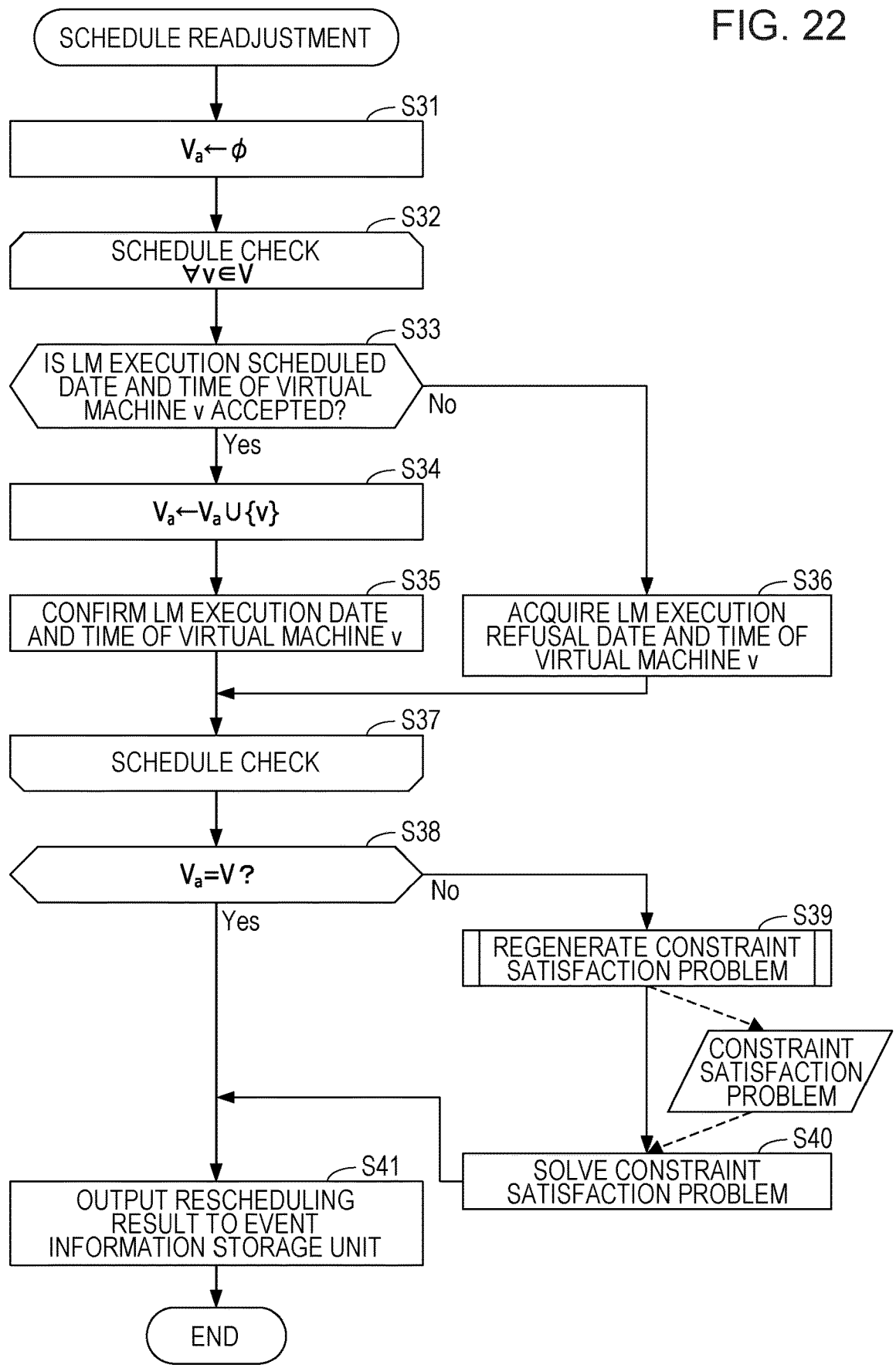
FIG. 22 is a flowchart illustrating exemplary schedule readjustment.

FIG. 22 is a flowchart illustrating exemplary schedule readjustment. The processing illustrated in FIG. 22 will be described below with reference to step numbers. A procedure described below corresponds to step S5 in FIG. 19.

(S31) The constraint condition generation unit 170 initializes the set $V_a$. Specifically, the constraint condition generation unit 170 sets the set $V_a$ to be empty set φ. The set $V_a$ is a set of virtual machines for which the LM execution schedule is confirmed.

(S32) The constraint condition generation unit 170 checks the LM schedule of each virtual machine. The constraint condition generation unit 170 repeatedly executes the procedure through steps S32 to S37 for all virtual machines belonging to V.

(S33) The constraint condition generation unit 170 determines whether the LM execution scheduled date and time of a virtual machine v is accepted by the user. When the LM execution scheduled date and time is accepted, the constraint condition generation unit 170 proceeds the processing to step S34. When the LM execution scheduled date and time is not accepted, the constraint condition generation unit 170 proceeds the processing to step S36. The constraint condition generation unit 170 performs the determination at step S33 by receiving a confirmation message of the LM execution scheduled date and time of LM of the virtual machine v presented to the user or a message of execution refusal date and time. When having received the confirmation message, the constraint condition generation unit 170 determines that the LM execution scheduled date and time is accepted by the user. When having received the message of execution refusal date and time, the constraint condition generation unit 170 determines that the LM execution scheduled date and time is not accepted by the user.

(S34) The constraint condition generation unit 170 adds the virtual machine v to the set $V_a$.

(S35) The constraint condition generation unit 170 determine the LM execution date and time of the virtual machine v. Specifically, the constraint condition generation unit 170 changes, from "yet to be confirmed" to "confirmed", the item of state in a record of the virtual machine v in the LM schedule table 162 stored in the event information storage unit 160. Then, the constraint condition generation unit 170 proceeds the processing to step S37.

(S36) The constraint condition generation unit 170 acquires the LM execution refusal date and time of the virtual machine v from the LM execution refusal date and time information M3 included in the message of execution refusal date and time, and stores the LM execution refusal date and time in the constraint condition storage unit 150. Then, the constraint condition generation unit 170 proceeds the processing to step S37.

(S37) The constraint condition generation unit 170 repeatedly executes steps S32 to S37 until the message of confirmation or execution refusal date and time by the user is processed for all virtual machines v belonging to V. When the message is processed for all virtual machines v, the constraint condition generation unit 170 proceeds the processing to step S38.

(S38) The constraint condition generation unit 170 determines whether $V_a$=V is satisfied (in other words, whether all elements of the set $V_a$ match with all elements of the set V). When $V_a$=V is satisfied, the constraint condition generation unit 170 proceeds the processing to step S41. When $V_a$=V is not satisfied, the constraint condition generation unit 170 proceeds the processing to step S39.

(S39) The constraint condition generation unit 170 executes constraint satisfaction problem regeneration processing. The constraint satisfaction problem regeneration processing will be described in detail later. Through the constraint satisfaction problem regeneration processing, the constraint condition generation unit 170 outputs a constraint satisfaction problem including a plurality of constraint conditions.

(S40) The solver unit 180 solves the constraint satisfaction problem output at step S39 to calculate the value of each output variable at each time in the maintenance execution duration.

(S41) The solver unit 180 updates the maintenance schedule table 161 and the LM schedule table 162 based on the value of each output variable at each time in the maintenance execution duration. The solver unit 180 changes, from "yet to be confirmed" to "confirmed", the item of state of a virtual machine, the LM schedule of which is updated in the LM schedule table 162. The solver unit 180 outputs, as a rescheduling result, the updated maintenance schedule table 161 and the updated LM schedule table 162. The solver unit 180 stores the rescheduling result in the event information storage unit 160.

When V=$V_a$ is satisfied at step S38, the LM execution scheduled dates and times of all virtual machines are accepted by the user, and thus the rescheduling result at step S41 is identical to the scheduling result at step S13.

The constraint condition generation unit 170 receives the LM execution refusal date and time of the virtual machine v at step S36, but may receive date and time (LM execution allow date and time) at which LM execution is allowed in place of the LM execution refusal date and time. Then, the constraint condition generation unit 170 may produce a constraint condition based on the LM execution allow date and time, and perform rescheduling through the solver unit 180.

Figure 23:
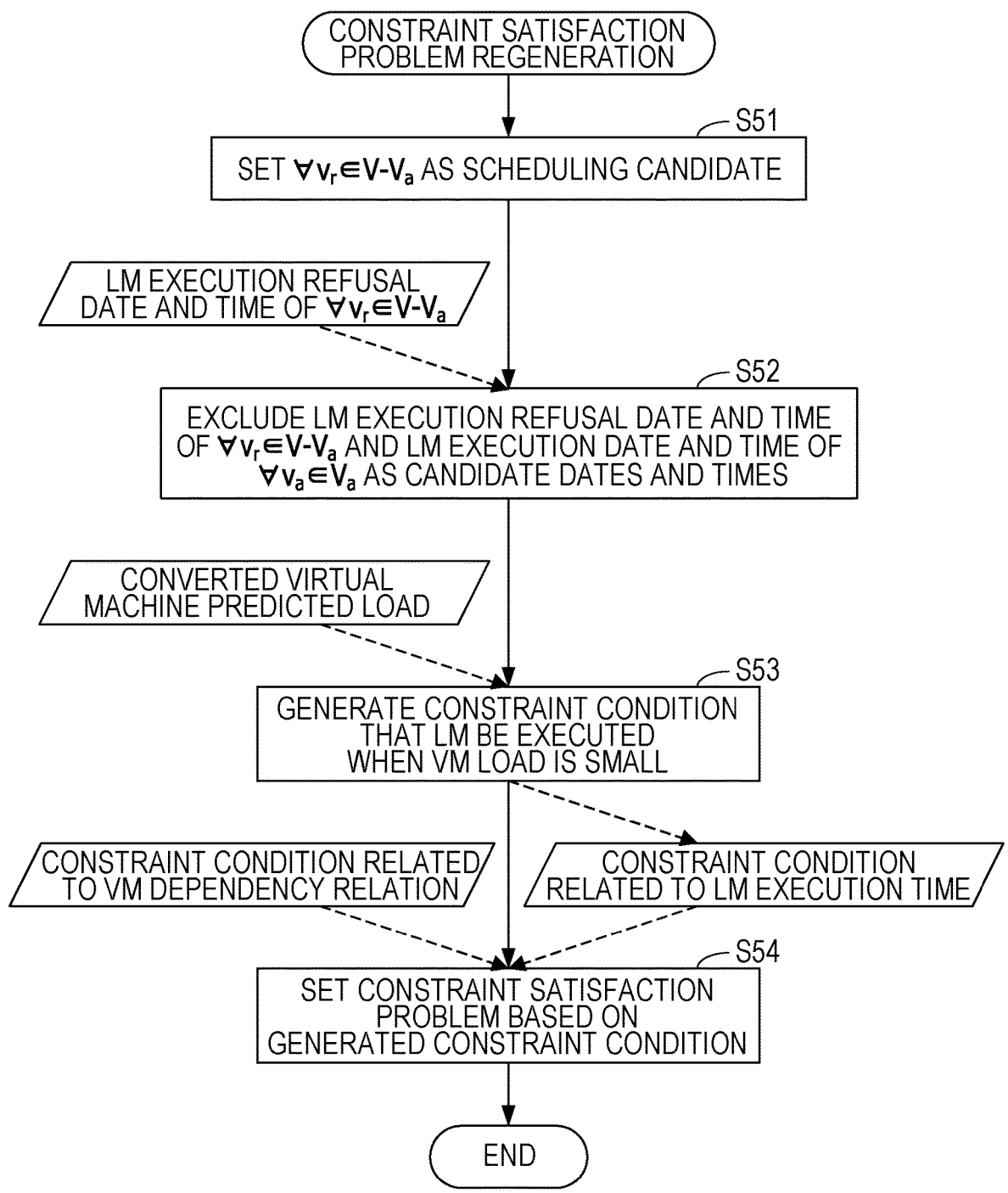
FIG. 23 is a flowchart illustrating exemplary regeneration of a constraint satisfaction problem.

FIG. 23 is a flowchart illustrating exemplary constraint satisfaction problem regeneration. The processing illustrated in FIG. 23 will be described below with reference to step numbers. A procedure described below corresponds to step S39 in FIG. 22.

(S51) The constraint condition generation unit 170 sets all virtual machines $v_r$ belonging to a set V-$V_a$ to be scheduling candidates. The set V-$V_a$ is a set of VMs, the LM execution schedules of which are not confirmed. The constraint condition generation unit 170 fixes LM execution scheduled date and time obtained as a result of first scheduling to a virtual machine, the LM execution scheduled date and time of which is accepted by the user through the first scheduling. Then, the constraint condition generation unit 170 sets the virtual machine $V_r$, the LM execution scheduled date and time of which is not accepted to be a rescheduling candidate.

(S52) The constraint condition generation unit 170 excludes the LM execution refusal date and time of the virtual machine $v_r$ and the LM execution date and time of a virtual machine $v_a$ (the virtual machine $v_a$ represents all elements of the set $V_a$) as LM execution candidate dates and times. Specifically, the constraint condition generation unit 170 excludes, only for the target virtual machine $V_r$, the LM execution refusal date and time of the virtual machine $v_r$ as candidate date and time (but, for any virtual machine other than the virtual machine $v_r$, the constraint condition generation unit 170 does not exclude the LM execution refusal date and time of the virtual machine $v_r$ as candidate date and time). The constraint condition generation unit 170 also excludes the LM execution date and time of the virtual machine $v_a$ as candidate date and time for all virtual machines. The constraint condition generation unit 170 reflects these exclusion contents on the value of availMigrationTimeSlot$_v$(t).

The LM execution refusal date and time of the virtual machine $v_r$ is information (stored in the constraint condition storage unit 150) acquired from the LM execution refusal date and time information M3. The LM execution date and time of the virtual machine $v_a$ is information registered to the LM schedule table 162.

(S53) The constraint condition generation unit 170 generates, based on the converted virtual machine predicted load, a constraint condition (constraint condition related to the LM execution time) so that LM is performed when the virtual machine (VM) load is small (in other words, when the LM turnaround time of each virtual machine is short). The constraint condition related to the LM execution time is, for example, the above-described second, third, sixth to tenth, and thirteenth constraint conditions. However, determined values of various variables are fixed for any virtual machine, the LM execution scheduled date and time of which is confirmed. The constraint condition generation unit 170 stores the generated constraint condition in the constraint condition storage unit 150.

(S54) The constraint condition generation unit 170 sets a constraint satisfaction problem based on the constraint condition related to the VM dependency relation generated at step S22 and the constraint condition related to the LM execution time generated at step S53.

At step S52, the LM execution date and time of the virtual machine $v_a$, the LM schedule of which is confirmed is excluded as candidate date and time. This reduces increase of a load on the system due to too much increased multiplicity of parallel LM execution. However, the LM execution date and time of the virtual machine $v_a$ does not have to be excluded as candidate date and time when the system load increase is not a problem.

The following exemplarily describes data input to the solver unit 180 and data output from the solver unit 180 in response to the input data.

FIG. 24 is a diagram illustrating exemplary input data (1) to the solver unit. For example, the input data includes the variables $t_s$, $t_e$, P, maintDuration$_p$, cpuCap$_p$, ramCap$_p$, and diskCap$_p$.

The expressions $t_s$:=0; and $t_e$:=41759; represent a maintenance execution duration (in the expressions, ":=" represents substitution, and ";" represents the end of substitution to a variable). The expression $t_s$:=0 indicates 12:00 on Jun. 1, 2017 as the start date and time of the maintenance execution duration. The expression $t_e$:=41759 indicates 11:59 on Jun. 30, 2017 as the end date and time of the maintenance execution duration. The set T is a set of values obtained discretizing a time between $t_s$ and $t_e$ into units of minutes.

The expression P:=("PM01", "PM02", . . . ; represents a set of physical machine names (PM names) (in FIG. 24, each line includes a physical machine name).

The expression maintDuration$_p$:=(("PM01" 60), ("PM02" 120), . . . ; represents the maintenance turnaround time (in units of minutes) of each physical machine. One record includes a pair of "physical machine name (PM name)" and "maintenance turnaround time". In FIG. 24, one line includes one record (this is same for the following other variables included in input data).

The expression cpuCap$_p$:=(("PM01" 64), ("PM02" 32), . . . ; represents the number of CPU cores of each physical machine. One record includes a pair of "PM name" and "the number of CPU cores".

The expression ramCap$_p$:=(("PM01" 256), ("PM02" 128), . . . ; represents the memory capacity of each physical machine. One record includes a pair of "PM name" and "memory capacity".

The expression diskCap$_p$:=(("PM01" 32000), ("PM02" 128000), . . . represents the disk capacity of each physical machine. One record includes a pair of "PM name" and "disk capacity".

FIG. 25 is a diagram illustrating exemplary input data (2) to the solver unit. The input data further includes the variables V and initAccommo$_{pv}$.

The expression V:=("accounting-db-13", "vm-67", . . . ; represents a set of virtual machine names (VM names).

The expression initAccommo$_{pv}$:=( . . . , "PM01 "mysql-67" 1), ("PM02" "mysql-67" 0), ("PM01" "accounting-db-03" 1), ("PM02" "accounting-db-03" 0), . . . ; represents a physical machine as the initial disposition target of each virtual machine. One record includes a set of "PM name", "virtual machine name (VM name)", and "0or1" (the last value is "1" when the physical machine is the initial disposition target of the virtual machine, or "0" otherwise).

FIG. 26 is a diagram illustrating exemplary input data (3) to the solver unit. The input data further includes the variable migrationDuration$_v$(t).

The expression migrationDuration$_v$(t):= . . . , ("server-90" 27180 15), ("mysql-67" 27180 15), . . . , ("server-90" 27239 15), ("mysql-67" 27239 15), . . . ; represents the LM turnaround time of each virtual machine. One record includes a pair of "VM name" and "time LM turnaround time (minutes)".

In FIG. 26, the time "27180" represents 9:00 on Jun. 20, 2017. The time "27239" represents 9:59 on Jun. 20, 2017. The time "27240" represents 10:00 on Jun. 20, 2017. The time "27241" represents 10:01 on Jun. 20, 2017.

FIG. 27 is a diagram illustrating exemplary input data (4) to the solver unit. The input data further includes the variables cpuReq$_v$, ramReq$_v$, and diskReq$_v$.

The expression cpuReq$_v$:=(("accounting-db-13" 2), ("vm-67" 2), . . . ; represents the number of CPU cores allocated to each virtual machine. One record includes a pair of "VM name" and "the number of CPU cores".

The expression ramReq$_v$:=(("accounting-db-13" 32), ("vm-67" 2), . . . ; represents a memory capacity allocated to each virtual machine. One record includes a pair of "VM name" and "memory capacity".

The expression diskReq$_v$:=("accounting-db-13" 2000), ("vm-67" 32), . . . ; represents a disk capacity allocated to each virtual machine. One record includes a pair of "VM name" and "disk capacity".

Figure 28:
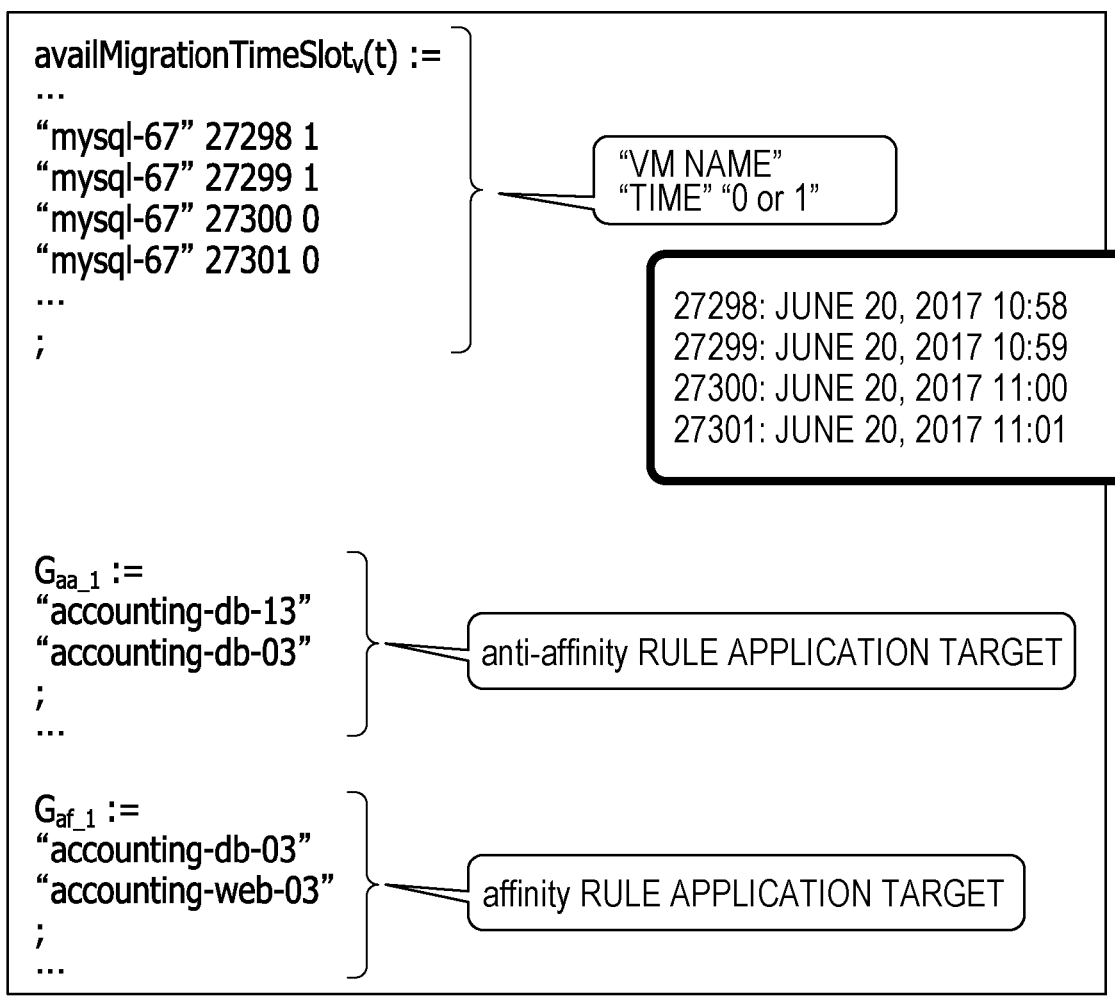
FIG. 28 is a diagram illustrating exemplary input data (5) to the solver unit.

FIG. 28 is a diagram illustrating exemplary input data (5) to the solver unit. The input data further includes the variables availMigrationTimeSlot$_v$(t), G$_{aa\_1}$, and G$_{af\_1}$.

The expression availMigrationTimeSlot$_v$(t):= . . . , ("mysql-67" 27298 1), ("mysql-67" 27299 1), ("mysql-67" 27300 0), ("mysql-67" 27301 0), . . . ; represents an LM execution allowed duration or execution refusal duration of each virtual machine. The last value is "1" when the execution is allowed, or "0" when the execution is refused. One record includes a set of "VM name", "time", and "0or1".

In FIG. 28, the time "27298" represents 10:58 on Jun. 20, 2017. The time "27299" represents 10:59 on Jun. 20, 2017. The time "27300" represents 11:00 on Jun. 20, 2017. The time "27301" represents 11:01 on Jun. 20, 2017.

The expression G$_{aa\_1}$:="accounting-db-13", "accounting-db-03"; represents a first group to which the anti-affinity rule is to be applied and a virtual machine belonging to the group. A second or later group to which the anti-affinity rule is to be applied is set in the same manner.

The expression G$_{af\_1}$:="accounting-db-03", "accounting-web-03"; represents a first group to which the affinity rule is to be applied and a virtual machine belonging to the group. A second or later group to which the affinity rule is to be applied is set in the same manner.

Figure 29:
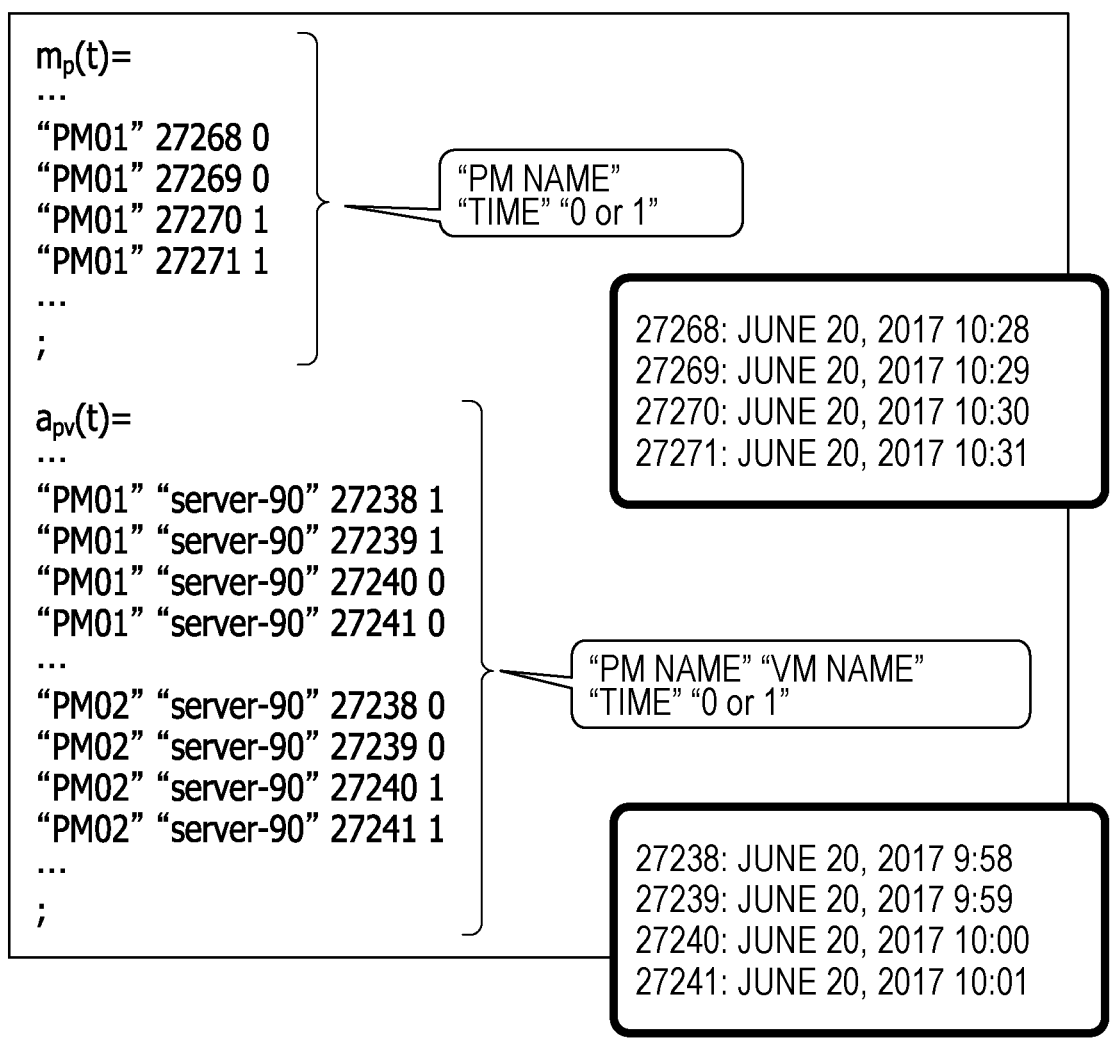
FIG. 29 is a diagram illustrating exemplary output data (1) from the solver unit.

FIG. 29 is a diagram illustrating exemplary output data (1) from the solver unit. For example, the solver unit 180 outputs the following output data solving the constraint satisfaction problem set by the constraint condition generation unit 170. The output data includes the variables m$_p$(t) and a$_{pv}$(t).

The expression m$_p$(t)= . . . , ("PM01" 27268 0), ("PM01" 27269 0), ("PM01" 27270 1), ("PM01" 27271 1), . . . ; represents the maintenance execution duration of each physical machine. One record includes a set of "PM name", "time", and "0or1" (the last value is "1" when the PM is under maintenance at the time, or "0" otherwise).

In FIG. 29, the time "27268" represents 10:28 on Jun. 20, 2017. The time "27269" represents 10:29 on Jun. 20, 2017. The time "27270" represents 10:30 on Jun. 20, 2017. The time "27271" represents 10:31 on Jun. 20, 2017.

The expression a$_{pv}$(t)= . . . , ("PM01" "server-90" 27238 1), ("PM01" "server-90" 27239 1), ("PM01" "server-90" 27240 0), ("PM01" "server-90" 27241 0), . . . ; represents any VM operating on each PM. One record includes a set of "PM name", "VM name", "time", and "0or1" (the value is "1" when the VM operates on the PM, or "0" otherwise).

In FIG. 29, the time "27238" represents 9:58 on Jun. 20, 2017. The time "27239" represents 9:59 on Jun. 20, 2017. The time "27240" represents 10:00 on Jun. 20, 2017. The time "27241" represents 10:01 on Jun. 20, 2017.

FIG. 30 is a diagram illustrating exemplary output data (2) from the solver unit. The output data further includes the variable$_{pv}$(t).

The expression l$_{pv}$(t)=("PM01" "server-90" 27238 0), ("PM01" "server-90" 27239 0), . . . , ("PM02" "server-90" 27238 0), ("PM02" "server-90" 27239 1), ("PM02" "server-90" 27240 0), . . . ; represents a completion time of LM of each virtual machine to a physical machine as a migration destination. One record includes a set of "PM name", "VM name", "time", and "0or1" (the last value is "1" for a time at which LM of the VM to the PM is completed, or "0" otherwise).

In FIG. 30, the time "27238" represents 9:58 on Jun. 20, 2017. The time "27239" represents 9:59 on Jun. 20, 2017. The time "27240" represents 10:00 on Jun. 20, 2017. The time "27241" represents 10:01 on Jun. 20, 2017. The time "27248" represents 10:08 on Jun. 20, 2017. The time "27249" represents 10:09 on Jun. 20, 2017. The time "27250" represents 10:10 on Jun. 20, 2017. The time "27251" represents 10:11 on Jun. 20, 2017.

The solver unit 180 obtains the LM schedule of each virtual machine from the contents of the output data. For example, according to the output result of l$_{pv}$(t), the end time of LM of "server-90" to "PM02" is "27239". According to the LM turnaround time table 131, the LM turnaround time when LM of a virtual machine having the virtual machine name "server-90" is completed at the time "27239" (9:59 on Jun. 20, 2017) is 15 minutes. Accordingly, the solver unit 180 determines the LM schedule of "server-90" to be a duration of 15 time slots between the times "27225" to "27239".

The solver unit 180 converts a duration indicated by the output data into the format of year, month, day, hour, minute, and second to produce the maintenance schedule table 161 and the LM schedule table 162.

The scheduler 112 presents a LM schedule produced by the solver unit 180 to the user, and prompts check by the user. The following describes an exemplary screen provided to the user terminal 500 by the management server 100.

Figure 31:
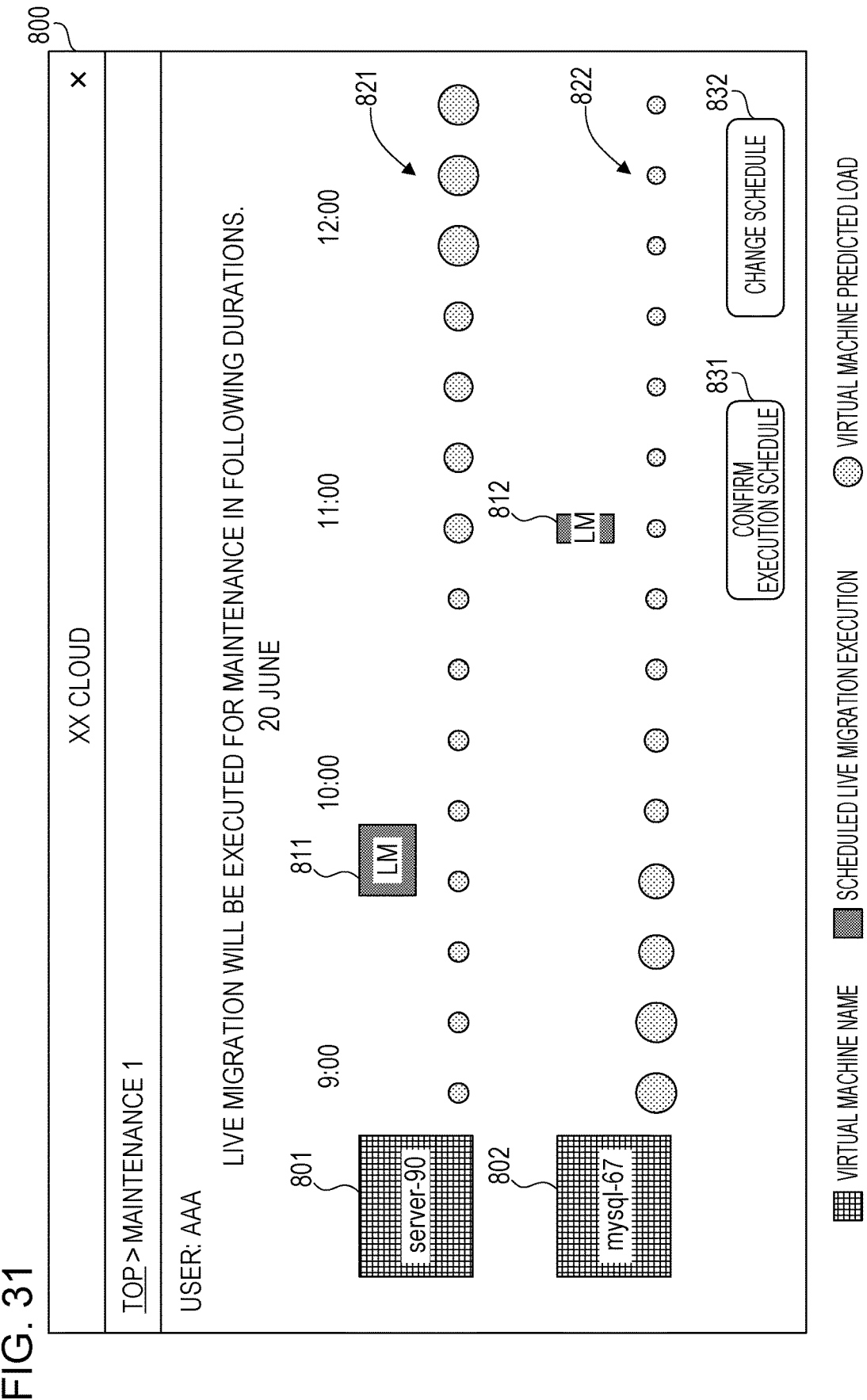
FIG. 31 is a diagram illustrating an exemplary LM schedule screen (1) for a user.

FIG. 31 is a diagram illustrating an exemplary LM schedule screen (1) for the user. A screen 800 is an exemplary screen provided to the user terminal 500 by the management server 100. The user terminal 500 receives screen information corresponding to the screen 800 from the management server 100, and displays, based on the screen information, the screen 800 on a display (display device) included in or connected with the user terminal 500. For example, the user terminal 500 is used by a user with the user ID of "user3", and the user name of the user is "AAA".

The scheduler 112 specifies, based on the virtual machine configuration table 122 (or the virtual machine operation table 123), the user ID of a user of each virtual machine registered to the LM schedule table 162. Information such as the user name of a user and the address of a terminal corresponding to the user ID is stored in the RAM 102 or the HDD 103 in advance. The scheduler 112 refers to this information to specify a user name and the destination of screen information.

The screen 800 includes VM symbols 801 and 802, LM symbols 811 and 812, predicted load symbol groups 821 and 822, and buttons 831 and 832.

The VM symbols 801 and 802 each represent a virtual machine as an LM target used by the corresponding user. For example, the VM symbol 801 represents a virtual machine having the virtual machine name "server-90". The VM symbol 802 represents a virtual machine having the virtual machine name "mysql-67". In this example of the screen 800, the LM schedule of each virtual machine is illustrated with a temporally sequential positive direction aligned with the direction from the left side to the right side on rows of the VM symbols 801 and 802.

The LM symbols 811 and 812 each represent LM execution scheduled date and time of each virtual machine. For example, the LM symbol 811 indicates that LM of the virtual machine having the virtual machine name "server-90" is executed between 9:45 on Jun. 20, 2017 and 9:59 on the same day. For example, the LM symbol 812 indicates that LM of the virtual machine having the virtual machine name "mysql-67" is executed between 11:00 on Jun. 20, 2017 and 11:09 on the same day.

The predicted load symbol groups 821 and 822 each represent the predicted load of each virtual machine at each time. For example, each symbol belonging to the predicted load symbol groups 821 and 822 is shaped in a circle, and the size of the circle represents the magnitude of the load (a larger diameter of the circle indicates a larger predicted load, and a smaller diameter of the circle indicates a smaller predicted load). The predicted load of each virtual machine is information based on which an LM schedule is determined. The user may check matching between the load of each virtual machine and the LM schedule (LM is executed when the load is small) by checking the predicted load symbol groups 821 and 822.

The button 831 is a button for inputting confirmation of the LM schedules on the screen 800. When having received an input through the button 831 by the user, the user terminal 500 transmits, for each virtual machine displayed on the screen 800, an LM schedule confirmation message to the management server 100.

The button 832 is a button for transition to a screen for changing the LM schedules on the screen 800.

Figure 32:
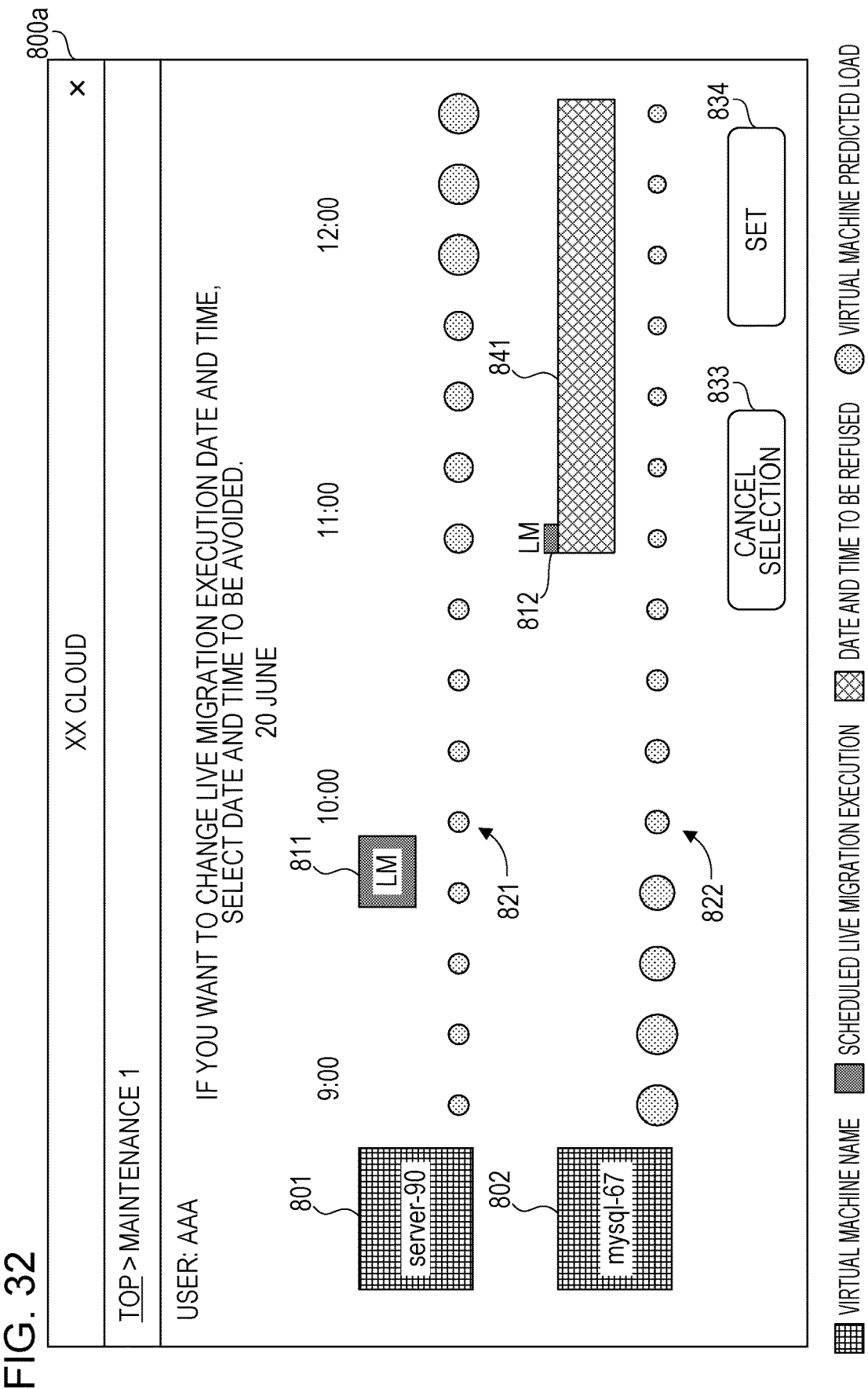
FIG. 32 is a diagram illustrating an exemplary LM schedule screen (2) for the user.

FIG. 32 is a diagram illustrating an exemplary LM schedule screen (2) for the user. A screen 800a is a screen for inputting the content (LM execution refusal date and time) of change of the LM schedules on the screen 800. The screen 800a is a screen provided to the user terminal 500 by the management server 100 in accordance with an input through the button 832 by the user. The screen 800a includes the VM symbols 801 and 802, the LM symbols 811 and 812, the predicted load symbol groups 821 and 822, buttons 833 and 834, and a LM execution refusal date and time symbol 841.

The button 833 is a button for canceling selection of LM execution refusal date and time through the LM execution refusal date and time symbol 841.

The button 834 is a button for setting LM execution refusal date and time selected by using the LM execution refusal date and time symbol 841. When having received an input through the button 834, the user terminal 500 transmits, to the management server 100, a refusal date and time message including the LM execution refusal date and time information M3 indicating the selected LM execution refusal date and time of a virtual machine. For a virtual machine, the LM execution refusal date and time of which is not selected on the screen 800a, the user terminal 500 transmits a confirmation message to the management server 100.

The LM execution refusal date and time symbol 841 is a symbol for receiving selection of LM execution refusal date and time by the user. For example, the user disposes the LM execution refusal date and time symbol 841 on the row of a desired virtual machine by using a pointing device connected with the user terminal 500. Then, the user selects LM execution refusal date and time for the virtual machine by changing the width of the LM execution refusal date and time symbol 841 in the lateral direction by using the pointing device. The user may dispose the LM execution refusal date and time symbol 841 over the LM symbol 812. In this example of the LM execution refusal date and time symbol 841, the duration between 11:00 on Jun. 20, 2017 and 13:59 on the same day is selected as LM execution refusal date and time for the virtual machine having the virtual machine name "mysql-67".

When having received the LM execution refusal date and time information M3 through the screen 800a, the management server 100 reproduces a constraint condition related to the LM execution time, and updates the LM schedule of a virtual machine for which LM execution refusal date and time is input. The management server 100 presents the updated LM schedule to the user again.

Figure 33:
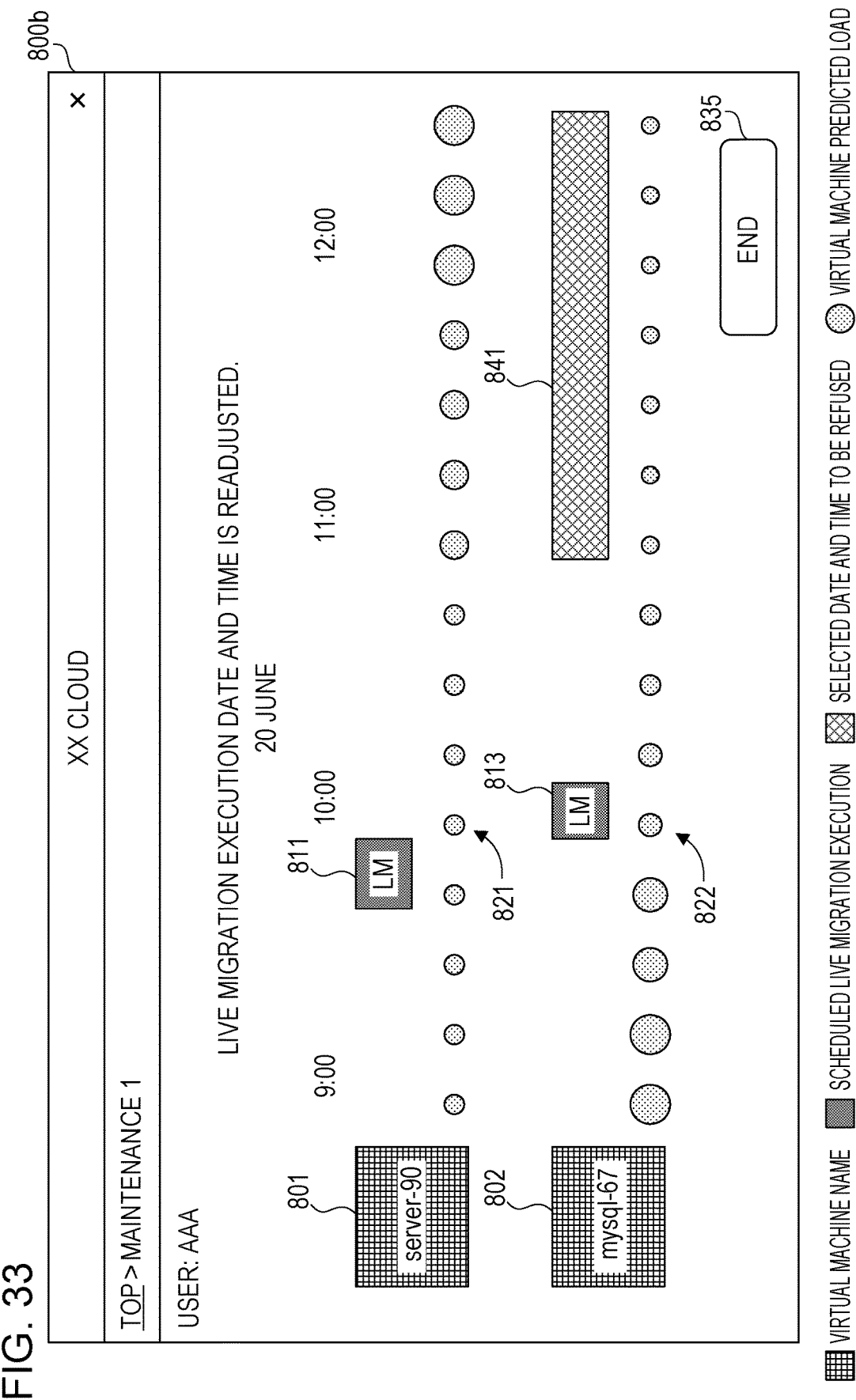
FIG. 33 is a diagram illustrating an exemplary LM schedule screen (3) for the user.

FIG. 33 is a diagram illustrating an exemplary LM schedule screen (3) for the user. A screen 800b is an exemplary screen provided to the user terminal 500 by the management server 100. The screen 800b displays an LM schedule updated in accordance with selection of LM execution refusal date and time through the screen 800a. The screen 800b includes the VM symbols 801 and 802, LM symbols 811 and 813, the predicted load symbol groups 821 and 822, a button 835, and the LM execution refusal date and time symbol 841.

The LM symbol 813 represents, for the virtual machine having the virtual machine name "mysql-67", an LM schedule reproduced based on LM execution refusal date and time input by the user (LM execution refusal date and time indicated by the LM execution refusal date and time symbol 841). Specifically, the LM symbol 813 indicates that LM of the virtual machine having the virtual machine name "mysql-67" is performed between 10:00 on Jun. 20, 2017 and 10:09 on the same day.

No LM execution refusal date and time is selected through the screen 800a for the virtual machine having the virtual machine name "server-90", and thus an initially determined LM schedule of the virtual machine having the virtual machine name "server-90" is not updated.

The button 835 is a button for ending check of the LM schedules of the virtual machines. When having received an input through the button 835, the user terminal 500 closes the screen 800b.

In the above-described examples, the user terminal 500 is provided with the screens 800, 800a, and 800b, but the user terminal 600 is provided with screens for checking the LM schedule of a virtual machine used by a user of the user terminal 600.

Figure 34:
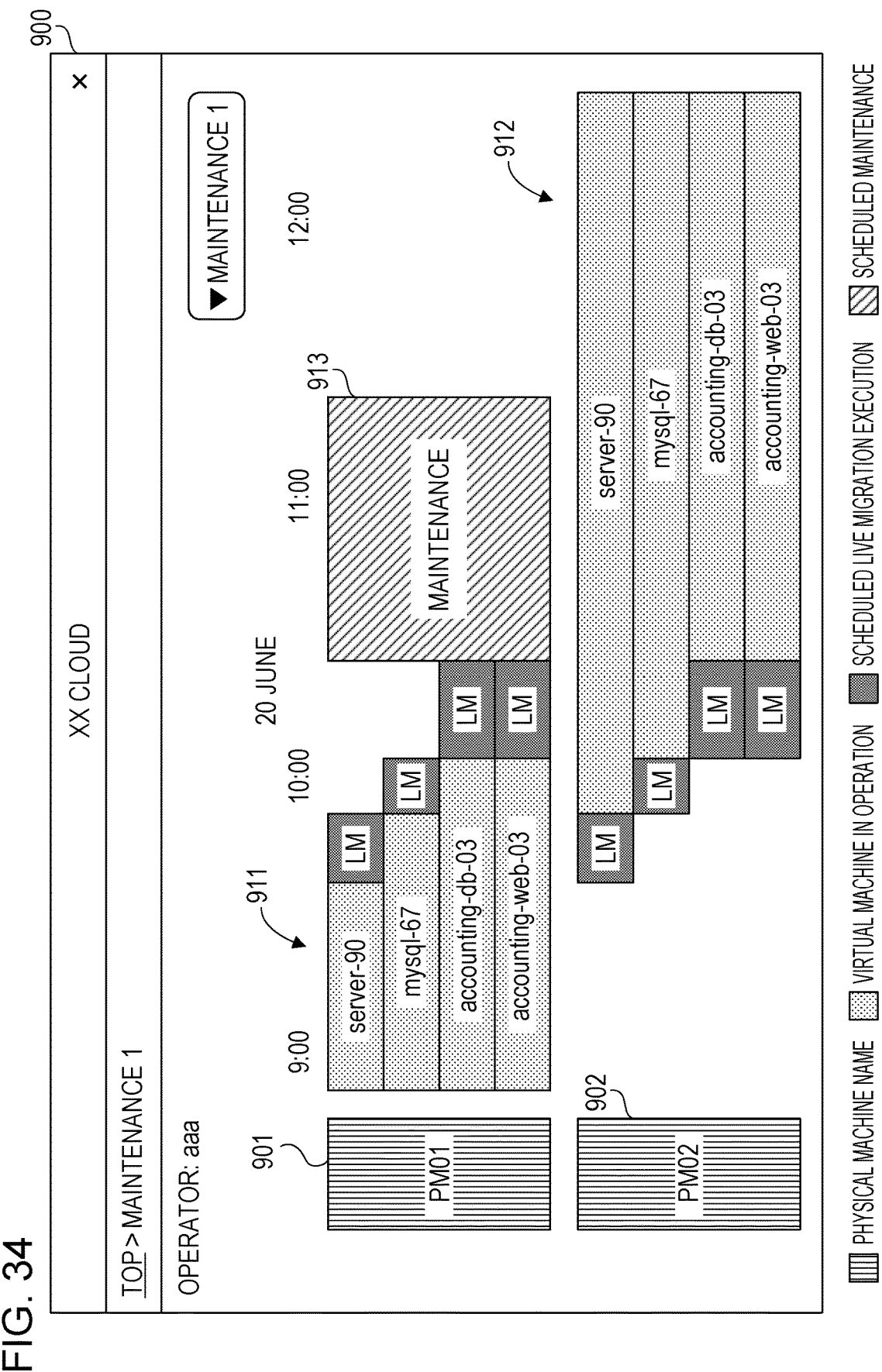
FIG. 34 is a diagram illustrating an exemplary maintenance schedule screen for an operator.

FIG. 34 is a diagram illustrating an exemplary maintenance schedule screen to the operator. A screen 900 is an exemplary screen provided to the operator terminal 700 by the management server 100. The screen 900 displays a maintenance schedule of a physical machine corresponding to an updated LM schedule displayed on the screen 800b. The operator terminal 700 receives screen information for drawing the screen 900 from the management server 100, and displays, based on the screen information, the screen 900 on a display (display device) included in or connected with the operator terminal 700. For example, the user name of a user is "aaa".

The screen 900 includes PM symbols 901 and 902, VM schedule symbols 911 and 912, and a maintenance symbol 913.

The PM symbols 901 and 902 each represent a physical machine as a maintenance target. For example, the PM symbol 901 represents the physical machine having the physical machine name "PM01". The PM symbol 902 represents the physical machine having the physical machine name "PM02". In this example of the screen 900, the operation schedule, LM schedule, and maintenance schedule of any virtual machine on each physical machine are illustrated with a temporally sequential positive direction aligned with the direction from the left side to the right side on rows of the PM symbols 901 and 902.

The VM schedule symbols 911 and 912 represent the operation schedule and LM schedule of each virtual machine. The VM schedule symbols 911 and 912 reflect the content of the LM schedule table 162 (obtained after an LM schedule is "confirmed" for each virtual machine). For example, the VM schedule symbol 911 represents the operation schedule of each of a plurality of virtual machines on the physical machine having the physical machine name "PM01", and the LM schedule of each virtual machine. The VM schedule symbol 912 represents the operation schedule of each of a plurality of virtual machines on the physical machine having the physical machine name "PM02", and the LM schedule of each virtual machine. With the VM schedule symbols 911 and 912, the operator knows that each virtual machine operates the physical machine having the physical machine name "PM01" before LM execution, but operates on the physical machine having the physical machine name "PM02" after LM execution.

The maintenance symbol 913 represents the maintenance schedule of a physical machine. The maintenance symbol 913 reflects on the content of the maintenance schedule table 161, and represents the maintenance schedule of the physical machine having the physical machine name "PM01". In this example of the maintenance symbol 913 indicates that maintenance is performed on the physical machine having the physical machine name "PM01" in the duration between 10:30 on Jun. 20, 2017 and 11:29 on the same day.

In this manner, the management server 100 produces a constraint condition related to the VM dependency relation based on the infrastructure configuration information, and a constraint condition related to the LM execution time based on the LM turnaround time table 131, and produces appropriate LM schedules of virtual machines by using the constraint conditions.

For example, the management server 100 determines, based on the constraint condition related to the VM dependency relation, the LM schedules of virtual machines without deviating from operational specifications of a physical machine and a virtual machine.

In particular, the constraint condition related to the VM dependency relation includes a constraint condition based on the dependency relation table 124. For example, when a migration schedule is produced only to minimize a time in which the use of a virtual machine by a user is affected, an operationally intended virtual machine dependency relation is potentially not satisfied.

For example, a virtual machine executing an application and a virtual machine executing a DB, which are to be allocated to an identical physical machine to improve performance, are migrated to separate physical machines. To avoid this, for example, the management server 100 produces a first constraint condition for operating a first group of virtual machines included in the infrastructure configuration information on an identical physical machine, and sets the migration destination of each virtual machine belonging to the first group to be an identical physical machine based on the first constraint condition.

For example, virtual machines executing software, which are to be allocated to separate physical machines to achieve redundancy, are migrated to a common physical machine. To avoid this, for example, the management server 100 produces a second constraint condition for operating each virtual machine belonging to a second group of virtual machines included in the infrastructure configuration information on a separate physical machine. Then, the management server 100 sets the migration destination of each virtual machine belonging to the second group to be a separate physical machine based on the second constraint condition.

In this manner, a dependency relation indicated by the infrastructure configuration information (in particular, the dependency relation table 124) is used as a constraint condition to reduce operationally unintended disposition of a virtual machine and thus decrease of the performance of the virtual machine.

In LM timing determination, for example, business convenience is input by a user in advance, and an LM schedule is determined based on the input business convenience. However, busyness of business assumed by the user deviates from the magnitude of a load on a virtual machine in some cases. For example, the user sets a night LM schedule because a virtual machine executes a personnel management application used mainly in daytime, but high-load batch processing is performed on the virtual machine at night, and completion of the batch processing is potentially impossible because of performance degradation due to LM. Thus, an LM schedule with which influence on business of the user is minimized may not be produced only with the sense of the user.

Thus, the management server 100 determines the LM schedule of a virtual machine based on a constraint condition related to the LM execution time so that the sum of LM turnaround times of the virtual machine (when a plurality of virtual machines are to be migrated, the sum of migration turnaround times of the plurality of virtual machines) is minimized. Specifically, the management server 100 produces a third constraint condition for minimizing the sum of the LM turnaround times of a plurality of virtual machines based on temporal information (for example, the LM turnaround time table 131) indicating the LM turnaround time of each virtual machine. Then, the management server 100 determines, based on the third constraint condition, a schedule with which the sum of the LM turnaround times of the plurality of virtual machines is minimized. Accordingly, the LM schedule of a virtual machine is determined with reduced influence on the use of the virtual machine by each user.

In addition, the management server 100 prompts the user to check an initially produced LM schedule of a virtual machine, and allows inputting of an LM execution refusal duration by the user. Accordingly, execution of LM in a schedule that does not match with business convenience of the user is avoided, thereby determining a more appropriate LM schedule with further reduced influence on the use of the virtual machine by the user.

The information processing according to the first embodiment is achievable through execution of a computer program by the processing unit 1b. The information processing according to the second embodiment is achievable through execution of a computer program by the processor 101. Each computer program may be recorded in the computer-readable recording medium 13.

For example, each computer program may be circulated by distributing the recording medium 13 in which the computer program is recorded. Alternatively, each computer program may be stored in another computer and distributed through a network. For example, the computer may store (install) each computer program recorded in the recording medium 13 or each computer program received from another computer in a storage device such as the RAM 102 or the HDD 103, read each computer program from the storage device, and execute the computer program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process, the process comprising:
upon acquisition of data indicating a duration of a maintenance execution related to a physical machine, producing a first constraint condition for a virtual machine operating on the physical machine based on configuration information related to the physical machine and the virtual machine and temporal information indicating a turnaround time for migration of the virtual machine from the physical machine to another physical machine, the first constraint condition including a condition that a sum of turnaround times for a migration of a plurality of virtual machines is minimized;
producing schedule information of the migration of the virtual machine, based on the first constraint condition and the duration of the maintenance execution; and
outputting the schedule information to a device used by a user of the virtual machine, the process further comprising:
acquiring, from the user in response to the output schedule information, data indicating an allowed time slot of the migration of the virtual machine,
reproducing the first constraint condition based on the allowed time slot,
reproducing the schedule information based on the reproduced first constraint condition, and
outputting the reproduced schedule information to the device.

2. The non-transitory, computer-readable recording medium according to claim 1, wherein
in the outputting the schedule information, information indicating a load on the virtual machine predicted for each time slot included in the schedule information is output to the device together with the schedule information.

3. The non-transitory, computer-readable recording medium according to claim 1, wherein
the temporal information further includes information indicating the turnaround time for the migration of each virtual machine at each time slot belonging to the duration of the maintenance execution.

4. The non-transitory, computer-readable recording medium according to claim 1, wherein,
in the producing the schedule information, a duration in which maintenance is performed on the physical machine is determined based on a maintenance turnaround time of the physical machine.

5. The non-transitory, computer-readable recording medium according to claim 1, wherein
producing a second constraint condition that each virtual machine belonging to a first group of virtual machines included in the configuration information is operated on an identical physical machine, and
producing the schedule information based on the first constraint condition and the second constraint condition, such that a migration destination of each virtual machine belonging to the first group is set to an identical physical machine.

6. The non-transitory, computer-readable recording medium according to claim 1, wherein
producing a third constraint condition that each virtual machine belonging to a second group of virtual machines included in the configuration information is operated on a separate physical machine, and
producing the schedule information based on the first constraint condition and the third constraint condition such that a migration destination of each virtual machine belonging to the second group is set to a separate physical machine based on the second constraint condition.

7. The non-transitory, computer-readable recording medium according to claim 1, the process further comprising:
instructing execution of the migration of the virtual machine to the another physical machine based on the produced schedule information.

8. The non-transitory, computer-readable recording medium according to claim 1, wherein
the turnaround time for the migration of the virtual machine is a turnaround time for live migration.

9. An apparatus comprising:
a memory configured to store configuration information related to a physical machine and a virtual machine that operates on the physical machine, and temporal information indicating a turnaround time for migration of the virtual machine from the physical machine to another physical machine; and
a processor coupled to the memory and configured to:
upon acquisition of data indicating a duration of a maintenance execution related to the physical machine, produce, based on the configuration information and the temporal information stored in the memory, a constraint condition for the virtual machine that operates on the physical machine, the constraint condition including a condition that a sum of turnaround times for a migration of a plurality of virtual machines is minimized;
produce schedule information of the migration of the virtual machine, based on the first constraint condition and the duration of the maintenance execution; and
output the schedule information to a device used by a user of the virtual machine;
acquire, from the user in response to the output schedule information, data indicating an allowed time slot of the migration of the virtual machine;
reproduce the first constraint condition based on the allowed time slot;
reproduce the schedule information based on the reproduced first constraint condition; and
output the reproduced schedule information to the device.

10. A method comprising:
upon acquisition of data indicating a duration of a maintenance execution related to a physical machine, producing a constraint condition for a virtual machine operating on the physical machine, based on configuration information related to the physical machine and the virtual machine and temporal information indicating a turnaround time for migration of the virtual machine from the physical machine to another physical machine, the constraint condition including a condition that a sum of turnaround times for a migration of a plurality of virtual machines is minimized;

producing schedule information of the migration of the virtual machine, based on the first constraint condition and the duration of the maintenance execution; and outputting the schedule information to a device used by a user of the virtual machine;

instructing execution of the migration of the virtual machine to the another physical machine based on the produced schedule information;

acquiring, from the user in response to the output schedule information, data indicating an allowed time slot of the migration of the virtual machine;

reproducing the first constraint condition based on the allowed time slot;

reproducing the schedule information based on the reproduced first constraint condition; and outputting the reproduced schedule information to the device.

11. A non-transitory, computer-readable recording medium having stored therein a program for causing a computer to execute a process, the process comprising:

upon acquisition of data indicating a duration of a maintenance execution related to a physical machine, producing a constraint condition for a virtual machine operating on the physical machine based on configuration information related to the physical machine and the virtual machine and temporal information indicating a turnaround time for migration of the virtual machine from the physical machine to another physical machine, the constraint condition including a condition that a sum of turnaround times for a migration of a plurality of virtual machines is minimized;

producing schedule information of the migration of the virtual machine, based on the first constraint condition and the duration of the maintenance execution; and outputting the schedule information to a device used by a user of the virtual machine;

acquiring, from the user in response to the output schedule information, data indicating an allowed time slot of the migration of the virtual machine;

reproducing the first constraint condition based on the allowed time slot;

reproducing the schedule information based on the reproduced first constraint condition; and outputting the reproduced schedule information to the device.

* * * * *